US012532432B2

United States Patent
Zhang et al.

(10) Patent No.: US 12,532,432 B2
(45) Date of Patent: Jan. 20, 2026

(54) HOTSPOT MITIGATION IN FLUID COOLING

(71) Applicant: Adeia Semiconductor Bonding Technologies Inc., San Jose, CA (US)

(72) Inventors: Ron Zhang, Sunnyvale, CA (US); Gaius Gillman Fountain, Jr., Youngsville, NC (US); Thomas Workman, San Jose, CA (US); Belgacem Haba, Saratoga, CA (US)

(73) Assignee: Adeia Semiconductor Bonding Technologies Inc., San Jose, CA (US)

( * ) Notice: Subject to any disclaimer, the term of this patent is extended or adjusted under 35 U.S.C. 154(b) by 0 days.

(21) Appl. No.: 18/750,955

(22) Filed: Jun. 21, 2024

(65) Prior Publication Data

US 2025/0311149 A1    Oct. 2, 2025

Related U.S. Application Data

(60) Provisional application No. 63/651,828, filed on May 24, 2024, provisional application No. 63/571,990, filed on Mar. 29, 2024.

(51) Int. Cl.
*H05K 7/20* (2006.01)
*H01L 23/473* (2006.01)

(52) U.S. Cl.
CPC ....... *H05K 7/20254* (2013.01); *H01L 23/473* (2013.01)

(58) Field of Classification Search
CPC ................ H05K 7/20254; H01L 23/473
See application file for complete search history.

(56) References Cited

U.S. PATENT DOCUMENTS

| 4,274,479 A | 6/1981 | Eastman |
| 5,309,986 A | 5/1994 | Itoh |

(Continued)

FOREIGN PATENT DOCUMENTS

| CN | 109524373 A | 3/2019 |
| CN | 111128976 A | 5/2020 |

(Continued)

OTHER PUBLICATIONS

"KoolMicro Inc. developed the World's First 2,000 W/cm2 Cooling Technology for High Heat Generation Chips," Press Release, 2 pages, downloaded from www.semiconductorpackagingnews.com/uploads/1/KoolMicro_High_Cooling_Power_Density.pdf on Nov. 22, 2023.

(Continued)

*Primary Examiner* — Zachary Pape
(74) *Attorney, Agent, or Firm* — HALEY GUILIANO LLP

(57) ABSTRACT

An integrated cooling assembly comprising a semiconductor device and a cold plate directly bonded to the semiconductor device. The cold plate comprises a top portion, sidewalls and a divider extending downwardly from the top portion to a backside of the semiconductor device, an inlet opening; and an outlet opening. The top portion, the sidewalls, the divider and the backside of the semiconductor device collectively define a first coolant channel and a second coolant channel extending laterally between the inlet opening and the outlet opening. A channel width of the first coolant channel in a direction parallel to the backside of the semiconductor device is greater than a channel width of the second coolant channel in in the same direction; and a portion of the first coolant channel is disposed above a hotspot region of the semiconductor device.

10 Claims, 9 Drawing Sheets

(56) References Cited

U.S. PATENT DOCUMENTS

| | | | |
|---|---|---|---|
| 5,522,452 | A | 6/1996 | Mizuno et al. |
| 5,769,154 | A | 6/1998 | Adkins et al. |
| 6,056,044 | A | 5/2000 | Benson et al. |
| 6,351,384 | B1 | 2/2002 | Daikoku et al. |
| 6,686,532 | B1 | 2/2004 | Macris |
| 6,822,326 | B2 | 11/2004 | Enquist et al. |
| 7,071,552 | B2 * | 7/2006 | Ravi .................. H01L 23/473 |
| | | | 257/E23.098 |
| 7,139,172 | B2 * | 11/2006 | Bezama .................. F28F 3/04 |
| | | | 174/15.1 |
| 7,289,326 | B2 | 10/2007 | Heydari et al. |
| 7,485,957 | B2 | 2/2009 | Brandenburg et al. |
| 7,511,372 | B2 | 3/2009 | Chiu |
| 7,523,617 | B2 | 4/2009 | Venkatasubramanian et al. |
| 7,622,324 | B2 | 11/2009 | Enquist et al. |
| 7,692,926 | B2 | 4/2010 | Henderson et al. |
| 7,957,137 | B2 | 6/2011 | Prasher |
| 7,978,473 | B2 | 7/2011 | Campbell et al. |
| 7,997,087 | B2 | 8/2011 | Venkatasubramanian et al. |
| 8,164,169 | B2 | 4/2012 | Chrysler et al. |
| 8,630,091 | B2 | 1/2014 | Ward et al. |
| 9,224,673 | B2 | 12/2015 | Chen et al. |
| 9,299,641 | B2 | 3/2016 | Sekar et al. |
| 9,355,932 | B2 | 5/2016 | Ankireddi et al. |
| 9,391,143 | B2 | 7/2016 | Tong et al. |
| 9,553,071 | B1 | 1/2017 | Haba |
| 9,741,638 | B2 | 8/2017 | Hsieh et al. |
| 9,741,696 | B2 | 8/2017 | Katkar et al. |
| 9,746,248 | B2 | 8/2017 | Semenov et al. |
| 9,768,149 | B2 | 9/2017 | Vadhavkar et al. |
| 9,818,723 | B2 | 11/2017 | Haba |
| 10,032,695 | B2 | 7/2018 | Iyengar et al. |
| 10,083,934 | B2 | 9/2018 | Haba |
| 10,157,818 | B2 | 12/2018 | Chen et al. |
| 10,170,392 | B2 | 1/2019 | Chainer et al. |
| 10,199,356 | B2 | 2/2019 | Kinsley |
| 10,312,221 | B1 | 6/2019 | Agarwal et al. |
| 10,332,823 | B2 | 6/2019 | Chen et al. |
| 10,461,059 | B2 | 10/2019 | Koopmans et al. |
| 10,694,641 | B2 | 6/2020 | Basu et al. |
| 10,978,427 | B2 | 4/2021 | Li et al. |
| 11,187,469 | B2 | 11/2021 | Karesh |
| 11,387,164 | B2 | 7/2022 | Wu et al. |
| 11,598,594 | B2 | 3/2023 | Lewis et al. |
| 11,996,351 | B2 | 5/2024 | Hsiao et al. |
| 12,087,664 | B2 * | 9/2024 | Hsu .................. H01L 24/16 |
| 12,322,677 | B1 * | 6/2025 | Zhang .................. H01L 23/46 |
| 2003/0157782 | A1 | 8/2003 | Kellar et al. |
| 2004/0184237 | A1 | 9/2004 | Chang |
| 2004/0251530 | A1 | 12/2004 | Yamaji |
| 2005/0126766 | A1 | 6/2005 | Lee et al. |
| 2005/0213301 | A1 | 9/2005 | Prasher |
| 2006/0042825 | A1 | 3/2006 | Lu et al. |
| 2006/0103011 | A1 | 5/2006 | Andry et al. |
| 2006/0226539 | A1 * | 10/2006 | Chang .................. H01L 23/473 |
| | | | 257/E23.098 |
| 2007/0002541 | A1 | 1/2007 | Chang et al. |
| 2007/0025082 | A1 | 2/2007 | Lee et al. |
| 2007/0107875 | A1 | 5/2007 | Lee et al. |
| 2008/0017978 | A1 * | 1/2008 | Brunschwiler ..... H01L 23/3677 |
| | | | 257/E23.105 |
| 2008/0096320 | A1 | 4/2008 | Farrar |
| 2009/0122491 | A1 | 5/2009 | Martin et al. |
| 2010/0116534 | A1 | 5/2010 | Choi et al. |
| 2010/0230805 | A1 | 9/2010 | Refai-Ahmed |
| 2010/0300202 | A1 | 12/2010 | Joyce |
| 2011/0129986 | A1 | 6/2011 | Libralesso et al. |
| 2013/0044431 | A1 | 2/2013 | Koeneman |
| 2013/0050944 | A1 | 2/2013 | Shepard |
| 2013/0087904 | A1 | 4/2013 | Clark et al. |
| 2014/0126150 | A1 | 5/2014 | Song et al. |
| 2015/0194363 | A1 | 7/2015 | Jun et al. |
| 2016/0276314 | A1 | 9/2016 | Ching et al. |
| 2017/0012016 | A1 | 1/2017 | Joshi et al. |
| 2017/0062366 | A1 * | 3/2017 | Enquist .................. H01L 24/05 |
| 2017/0092565 | A1 | 3/2017 | Chen et al. |
| 2017/0103937 | A1 | 4/2017 | Hsieh et al. |
| 2018/0053730 | A1 | 2/2018 | Shao et al. |
| 2018/0087842 | A1 | 3/2018 | Chainer et al. |
| 2018/0090427 | A1 | 3/2018 | Bernstein et al. |
| 2018/0160565 | A1 | 6/2018 | Parida |
| 2018/0211900 | A1 | 7/2018 | Gutala et al. |
| 2018/0239641 | A1 * | 8/2018 | Kumar .................. G06F 9/5044 |
| 2018/0308783 | A1 | 10/2018 | Refai-Ahmed et al. |
| 2019/0008071 | A1 | 1/2019 | Kim |
| 2019/0355706 | A1 | 11/2019 | Enquist et al. |
| 2019/0385928 | A1 | 12/2019 | Leobandung |
| 2020/0035583 | A1 | 1/2020 | Beauchemin et al. |
| 2020/0105639 | A1 | 4/2020 | Valavala et al. |
| 2020/0312742 | A1 | 10/2020 | Lofgreen et al. |
| 2020/0343160 | A1 | 10/2020 | Mizerak et al. |
| 2020/0350233 | A1 | 11/2020 | Mizerak et al. |
| 2020/0352053 | A1 | 11/2020 | Mizerak et al. |
| 2020/0395313 | A1 | 12/2020 | Mallik et al. |
| 2020/0395321 | A1 * | 12/2020 | Katkar .................. H01L 23/552 |
| 2021/0066164 | A1 | 3/2021 | Wu et al. |
| 2021/0175143 | A1 | 6/2021 | Yu et al. |
| 2021/0183741 | A1 | 6/2021 | Jha et al. |
| 2021/0193548 | A1 | 6/2021 | Wan et al. |
| 2021/0193620 | A1 | 6/2021 | Refai-Ahmed et al. |
| 2021/0280497 | A1 * | 9/2021 | Brun .................. H01L 23/053 |
| 2021/0288037 | A1 | 9/2021 | Tao et al. |
| 2021/0378106 | A1 | 12/2021 | Iyengar et al. |
| 2021/0378139 | A1 | 12/2021 | Rice et al. |
| 2021/0410329 | A1 | 12/2021 | Yang et al. |
| 2022/0037231 | A1 | 2/2022 | Hsiao et al. |
| 2022/0087059 | A1 | 3/2022 | Sathyamurthy et al. |
| 2022/0117115 | A1 | 4/2022 | Malouin et al. |
| 2022/0130734 | A1 | 4/2022 | Chiu et al. |
| 2022/0189850 | A1 | 6/2022 | Liff et al. |
| 2022/0210949 | A1 | 6/2022 | Edmunds et al. |
| 2022/0230937 | A1 | 7/2022 | Malouin et al. |
| 2022/0408592 | A1 | 12/2022 | Malouin et al. |
| 2023/0048500 | A1 | 2/2023 | Malouin et al. |
| 2023/0154828 | A1 | 5/2023 | Haba et al. |
| 2023/0156959 | A1 | 5/2023 | Malouin et al. |
| 2023/0207474 | A1 | 6/2023 | Uzoh et al. |
| 2023/0245950 | A1 | 8/2023 | Haba et al. |
| 2023/0284421 | A1 | 9/2023 | Malouin et al. |
| 2023/0298969 | A1 | 9/2023 | Park et al. |
| 2024/0038633 | A1 | 2/2024 | Haba et al. |
| 2024/0096742 | A1 * | 3/2024 | Choo .................. H01L 21/4871 |
| 2024/0203823 | A1 | 6/2024 | Uzoh et al. |
| 2024/0222222 | A1 | 7/2024 | Haba et al. |
| 2024/0222226 | A1 | 7/2024 | Haba |
| 2024/0249995 | A1 | 7/2024 | Haba |
| 2024/0249998 | A1 | 7/2024 | Gao et al. |
| 2024/0266255 | A1 | 8/2024 | Haba et al. |
| 2025/0210459 | A1 * | 6/2025 | Haba .................. H01L 23/427 |

FOREIGN PATENT DOCUMENTS

| | | |
|---|---|---|
| CN | 115719735 A | 2/2023 |
| JP | 2000-340727 A | 12/2000 |
| KR | 10-1049508 B1 | 7/2011 |
| KR | 10-2023-0136509 A | 9/2023 |
| TW | 200834871 A | 8/2008 |
| WO | 2013/097146 A1 | 7/2013 |

OTHER PUBLICATIONS

"Single-Phase Direct-to-Chip Liquid Cooling," 6 pages, downloaded from https://jetcool.com/post/single-phase-direct-to-chip-liquid-cooling-microconvective-vs-microchannel-liquid-cooled-cold-plates/ on Mar. 7, 2024.

"Microconvective Liquid Cooling for high power electronics," https://jetcool.com/technology/, downloaded Mar. 7, 2024, 6 pages.

Benson D.A. et al., "Micro-Machined Heat Pipes in Silicon MCM Substrates", Sandia National Laboratories, Sandia Report: SAND97-0100-UC-704, printed Jan. 1997, 17 pages.

International Search Report and Written Opinion mailed Jun. 5,

(56) References Cited

OTHER PUBLICATIONS 2024, in International Application No. PCT/US2024/013758, 9 pages.

International Search Report and Written Opinion mailed Mar. 16, 2023, in International Application No. PCT/US2022/050105, 9 pages.

International Search Report and Written Opinion mailed May 30, 2023, in International Application No. PCT/US2023/061494, 9 pages.

Johnstone, Caitlin, "Coolant-on-Chip: Say Goodbye to Thermal Interfaces," jetcool, Jun. 9, 2020, https://jetcool.com/post/coolant-on-chip-say-goodbye-to-thermal-interfaces/, downloaded Feb. 29, 2024, 7 pages.

Lien, Y-J, et al., "An Energy-efficient Si-integrated Micro-cooler for High Power and Power-density Computing Applications," 74th Electronic Components and Technology Conference, 2024, pp. 1025-1029.

Walsh, Stephen Michael, "Microjet Impingement Cooling of High Power-Density Electronics," Thesis, submitted May 11, 2018, 93 pages.

Evan G. Colgan, "A Practical Implementation Of Silicon Microchannel Coolers", available online at <https://www.electronics-cooling.com/2007/11/a-practical-implementation-of-silicon-microchannel-coolers/>, Nov. 1, 2007, 10 pages.

Francisco Pires, "TSMC Exploring On-Chip, Semiconductor-Integrated Watercooling", tom's Hardware, retrieved from https://www.tomshardware.com/news/tsmc-exploring-on-chip-semiconductor-integrated-watercooling, Jul. 13, 2021, 23 pages.

IBM, "Functional electronic packaging—Thermal management roadmap", available online at <https://web.archive.org/web/20170220095511/https://www.zurich.ibm.com/st/electronicpackaging/cooling.html>, Feb. 20, 2017, 7 pages.

International Search Report and Written Opinion received for PCT Patent Application No. PCT/US23/28942, mailed on Nov. 16, 2023, 12 pages.

International Search Report and Written Opinion received for PCT Patent Application No. PCT/US23/84874, mailed on Apr. 22, 2024, 7 pages.

International Search Report and Written Opinion received for PCT Patent Application No. PCT/US23/85801, mailed on Apr. 26, 2024, 8 pages.

International Search Report and Written Opinion received for PCT Patent Application No. PCT/US23/85816, mailed on Apr. 23, 2024, 11 pages.

International Search Report and Written Opinion received for PCT Patent Application No. PCT/US23/86233, mailed on Apr. 26, 2024, 7 pages.

Kaplan, F. et al., "LoCool: Fighting Hot Spots Locally for System Energy Efficiency" IEEE Transactions on Computer-Aided Design of Intergrated Circuits and Systems, 39(4):895-908 (2020).

U.S. Appl. No. 18/129,567, filed Mar. 31, 2023, First Name Inventor: Cyprian Emeka Uzoh, "Embedded Cooling Systems for Device Packages and Methods of Cooling Packaged Devices".

PCT Application No. PCT/US2024/022253, International Search Report and Written Opinion dated Jul. 17, 2024,14 pages.

Shamsa, M., et al., "Thermal conductivity of diamond-like carbon films", Applied Physics Letters, vol. 89, No. 16, Oct. 20, 2006, pp. 161921-161921-3.

Wu, C. J., et al., "Ultra High Power Cooling Solution for 3D-Ics", 2021 Symposium on VLSI Technology, Jun. 2021, 2 pages.

\* cited by examiner

HOTSPOT MITIGATION IN FLUID COOLING

CROSS-REFERENCE TO RELATED APPLICATIONS

This application claims the benefit of U.S. Provisional Patent Application No. 63/571,990 filed Mar. 29, 2024 and U.S. Provisional Patent Application No. 63/651,828 filed May 24, 2024, each of which is hereby incorporated by reference herein in its entirety.

FIELD

The present disclosure relates to advanced packaging for microelectronic devices, and in particular, cooling systems for device packages and methods of manufacturing the same.

BACKGROUND

Energy consumption poses a critical challenge for the future of large-scale computing as the world's computing energy requirements are rising at a rate that most would consider unsustainable. Some models predict that the information, communication and technology (ICT) ecosystem could exceed 20% of global electricity use by 2030, with direct electrical consumption by large-scale computing centers accounting for more than one-third of that energy usage. A significant portion of the energy used by such large-scale computing centers is devoted to cooling since even small increases in operating temperatures can negatively impact the performance of microprocessors, memory devices, and other electronic components. While some of this energy is expended to operate the cooling systems that are directly cooling the chips (e.g., heat spreaders, heat pipes, etc.), energy consumption/costs for indirect cooling can also be quite staggering. Indirect cooling energy costs include, for example, cooling or air conditioning of data center buildings. Data center buildings can house thousands, to tens of thousands or more, of high performance chips in server racks and each of those high performance chips is a heat source. An uncontrolled ambient temperature in a data center will adversely affect the performance of the individual chips and the data center system performance as a whole.

Thermal dissipation in high-power density chips (semiconductor devices/die) is also a critical challenge as improvements in chip performance, e.g., through increased gate or transistor density due to advanced processing nodes, evolution of multi-core microprocessors, etc. have resulted in increased power density and a corresponding increase in thermal flux that contributes to elevated chip temperatures. Higher density of transistors also increases the length of metal wiring on the chips, which generates its own additional thermal flux due to Joule heating of these wires due to higher currents. These elevated temperatures are undesirable as they can degrade the chip's operating performance, efficiency, reliability, and remaining life. Cooling systems used to maintain the chip at a desired operating temperature typically remove heat using one or more heat dissipation devices, e.g., thermal spreaders, heat pipes, cold plates, liquid cooled heat pipe systems, thermal-electric coolers, heat sinks, etc. One or more thermal interface material(s), such as, for example, thermal paste, thermal adhesive, or thermal gap filler, may be used to facilitate heat transfer between the surfaces of a chip and heat dissipation device(s). A thermal interface material(s) (TIM(s)) is any material that is inserted between two components to enhance the thermal coupling therebetween. Unfortunately, the combined thermal resistance of (i) the thermal resistance of interfacial boundary regions between a TIM(s) and the chip and/or the heat dissipation device(s); and (ii) the thermal resistance of a thermal interface material(s) itself can inhibit heat transfer from the chip to the heat dissipation devices, undesirably reducing the cooling efficiency of the cooling system.

Generally speaking, there are multiple components between the heat dissipating sources (i.e., active circuitry) in the chips and the heat dissipation devices, each of which contribute to the system thermal resistance accumulatively along the heat transfer paths and raise chip junction temperatures from the ambient.

Such cooling systems can suffer from reduced cooling efficiency due to the design and manufacture of system components.

Furthermore, a semiconductor chip is a complex assembly containing numerous electronic components, each generating varying amounts of heat. This inherent non-uniformity in heat dissipation across the chip poses a challenge for thermal management systems, often leading to inefficiencies and potential overheating.

Accordingly, there exists a need in the art for improved energy-efficient cooling systems, by reducing system thermal resistance, and methods of manufacturing the same.

SUMMARY

Embodiments herein provide integrated cooling assemblies embedded in advanced device packages. Advantageously, the integrated cooling assemblies deliver appropriate cooling power directly to one or more regions of a semiconductor device to obtaining temperature uniformity across the device.

A first general aspect includes, an integrated cooling assembly comprising a semiconductor device, and a cold plate directly bonded to the semiconductor device. The cold plate comprises a top portion, sidewalls, a divider extending downwardly from the top portion to a backside of the semiconductor device, an inlet opening; and an outlet opening. The top portion, the sidewalls, the divider and the backside of the semiconductor device collectively define a first coolant channel and a second coolant channel extending laterally between the inlet opening and the outlet opening. A channel width of the first coolant channel in a direction parallel to the backside of the semiconductor device is greater than a channel width of the second coolant channel in in the same direction; and a portion of the first coolant channel is disposed above a hotspot region of the semiconductor device.

A second general aspect includes an integrated cooling assembly comprising a semiconductor device, and a cold plate directly bonded to the semiconductor device. The cold plate comprises a top portion, sidewalls, a divider extending downwardly from the top portion to a backside of the semiconductor device, a first inlet opening, a second inlet opening and an outlet opening disposed in the top portion. The top portion, the sidewalls, the divider and the backside of the semiconductor device collectively define a first coolant channel and a second coolant channel extending laterally between the second inlet opening and the outlet opening. The first inlet opening and the outlet opening are in fluid communication with the first coolant channel. The second inlet opening and the outlet opening are in fluid communication with the second coolant channel and a portion of the first coolant channel is disposed above a hotspot region of the semiconductor device.

A third general aspect includes a method of using a device package according to the first general aspect. The method comprises supplying fluid into the inlet opening, and out of the outlet opening to directly cool the semiconductor device.

A fourth general aspect includes a method of using a device package according to the second general aspect. The method comprises supplying fluid into the first and second inlet openings, and out of the outlet opening to directly cool the semiconductor device.

A fifth general aspect includes a method of manufacturing a device package according to the first general aspect. The method comprises forming a cold plate comprising an inlet opening and an outlet opening, and directly bonding the cold plate to a substrate comprising the semiconductor device.

A sixth general aspect includes a method of manufacturing a device package according to the second general aspect. The method comprises forming a cold plate comprising a first inlet opening, a second inlet opening and an outlet opening. The method further comprises directly bonding the cold plate to a substrate comprising the semiconductor device.

BRIEF DESCRIPTION OF THE DRAWINGS

The above and other objects and advantages of the disclosure will be apparent upon consideration of the following detailed description, taken in conjunction with the accompanying drawings, in which.

Figure 1:
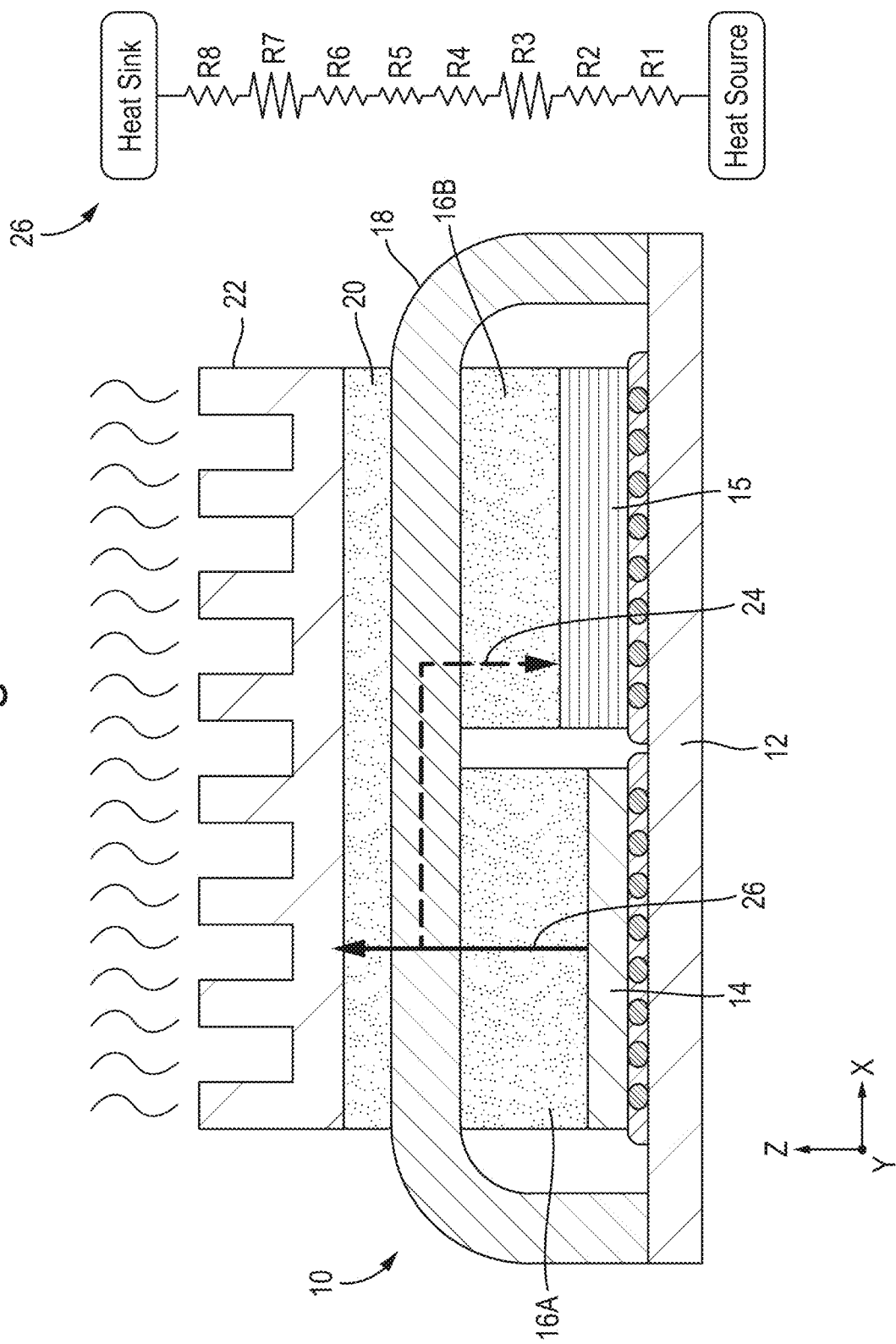
FIG. 1 illustrates a device package with an external heat sink.

The figures herein depict various embodiments of the for purposes of illustration only. It will be appreciated that additional or alternative structures, assemblies, systems, and methods may be implemented within the principles set out by the present disclosure.

DETAILED DESCRIPTION

As used herein, the term "substrate" means and includes any workpiece, wafer, or article that provides a base material or supporting surface from which or upon which components, elements, devices, assemblies, modules, systems, or features of the heat-generating devices, packaging components, and cooling assembly components described herein may be formed or mounted. The term substrate also includes "semiconductor substrates" that provide a supporting material upon which elements of a semiconductor device are fabricated or attached, and any material layers, features, and/or electronic devices formed thereon, therein, or therethrough. Examples of substrate material that may be used in applications that generate high thermal density include, but are not limited to, Si, GaN, SiC, InP, GaP, InGaN, AlGaInP, AlGaAs, etc.

As described below, the semiconductor substrates herein generally have a "device side," e.g., the side on which semiconductor device elements are fabricated, such as transistors, resistors, and capacitors, and a "backside" that is opposite the device side. The term "active side" should be understood to include a surface of the device side of the substrate and may include the device side surface of the semiconductor substrate and/or a surface of any material layer, device element, or feature formed thereon or extending outwardly therefrom, and/or any openings formed therein. Thus, it should be understood that the material(s) that form the active side may change depending on the stage of device fabrication and assembly. Similarly, the term "non-active side" (opposite the active side) includes the non-active side of the substrate at any stage of device fabrication, including the surfaces of any material layer, any feature formed thereon, or extending outwardly therefrom, and/or any openings formed therein. Thus, the terms "active side" or "non-active side" may include the respective surfaces of the semiconductor substrate at the beginning of device fabrication and any surfaces formed during material removal, e.g., after substrate thinning operations. Depending on the stage of device fabrication or assembly, the terms "active sides" and "non-active sides" are also used to describe surfaces of material layers or features formed on, in, or through the semiconductor substrate, whether or not the material layers or features are ultimately present in the fabricated or assembled device. For example, in some instances, the term "active side" is used to indicate a surface of a substrate that will in the future, but does not yet, include semiconductor device elements.

Spatially relative terms are used herein to describe the relationships between elements, such as the relationships between substrates, heat-generating devices, cooling assembly components, device packaging components, and other features described below. Unless the relationship is otherwise defined, terms such as "above," "over," "upper," "upwardly," "outwardly," "on," "below," "under," "beneath," "lower," "top," "bottom" and the like are generally made with reference to the X, Y, and Z directions set forth by X, Y and Z axis in the drawings. Thus, it should be understood that the spatially relative terms used herein are intended to encompass different orientations of the substrate and, unless otherwise noted, are not limited by the direction of gravity. Unless the relationship is otherwise defined, terms describing the relationships between elements such as "disposed on," "embedded in," "coupled to," "connected by," "attached to," "bonded to," either alone or in combination with a spatially relevant term include both relationships with intervening elements and direct relationships where there are no intervening elements. Furthermore, the term "horizontal" is generally made with reference to the X-axis direction and the Y-axis direction set forth in the drawings. The term "vertical" is generally made with reference to the Z-axis direction set forth in the drawings.

Various embodiments disclosed herein include bonded structures in which two or more elements are directly bonded to one another without an intervening adhesive (referred to herein as "direct bonding", or "directly bonded"). In some embodiments, direct bonding includes the bonding of a single material on the first of the two or more elements and a single material on a second one of the two or more elements, where the single material on the different elements may or may not be the same. For example, bonding a layer of one inorganic dielectric (e.g., silicon oxide) to another layer of the same or different inorganic dielectric. As discussed in more detail below, the process of direct bonding provides a reduction of thermal resistance between a semiconductor device and a cold plate. The term "cold plate", as used herein, describes a component used for thermal management. A cold plate typically functions to dissipate heat generated by the semiconductor device during operation by transferring heat away from the semiconductor device. This helps in maintaining the semiconductor device at an appropriate temperature. Overheating the semiconductor device can damage the semiconductor device and/or reduce its performance. A cold plate may be made from or include a material having high thermal conductivity (relative to one or more other components of the semiconductor device) and/or have elements or features (such as channels or fins) to increase the surface area for heat transfer. Coolant fluid flowing through the channels in a cold plate may be used to absorb heat from the semiconductor device and carry it away. Examples of dielectric materials used in direct bonding include oxides, nitrides, oxynitrides, carbonitrides, and oxycarbonitrides, etc., such as, for example, silicon oxide, silicon nitride, silicon oxynitride, silicon carbonitride, silicon oxycarbonitride, etc. Direct bonding can also include bonding of multiple materials on one element to multiple materials on the other element (e.g., hybrid bonding). As used herein, the term "hybrid bonding" refers to a species of direct bonding having both i) at least one ($1^{st}$) nonconductive feature directly bonded to another ($2^{nd}$) nonconductive feature, and ii) at least one ($1^{st}$) conductive feature directly bonded to another ($2^{nd}$) conductive feature, without any intervening adhesive. In some hybrid bonding embodiments, there are many $1^{st}$ conductive features, each directly bonded to a $2^{nd}$ conductive feature, without any intervening adhesive. In some embodiments, nonconductive features on the first element are directly bond to nonconductive features of the second element at room temperature without any intervening adhesive, which is followed by bonding of conductive features of the first element directly bonded to conductive features of the second element at via annealing at slightly higher temperatures (e.g., >100° C., >200° C., >250° C., >300° C., etc.)

Unless otherwise noted, the terms "cooling assembly" and "integrated cooling assembly" generally refer to a semiconductor device and a cold plate attached to the semiconductor device. Typically, the cold plate is formed with recessed surfaces that define one or more fluid cavities (e.g., coolant chamber volume(s) or coolant channel(s)) between the cold plate and the semiconductor device. In embodiments where the cold plate is formed with plural fluid cavities, each fluid cavity may be defined by cavity dividers and/or sidewalls of the cold plate. For example, cavity dividers may be spaced apart from each other and extend laterally between opposing cold plate sidewalls (e.g., in one direction between a first pair of opposing cold plate sidewalls, or in two directions between orthogonal pairs of opposing cold plate sidewalls). The cavity dividers and the cold plate sidewalls may collectively define adjacent fluid cavities therebetween. The cold plate may comprise a polymer material. The cold plate may be attached to the semiconductor device by use of a compliant adhesive layer or by direct bonding or hybrid bonding. For example, the cold plate may include material layers and/or metal features which facilitate direct bonding or hybrid bonding with the semiconductor device. Beneficially, the backside of the semiconductor device is directly exposed to coolant fluids flowing through the integrated cooling assembly, thus providing for direct heat transfer therebetween. Unless otherwise noted, the integrated cooling assemblies described herein may be used with any desired fluid, e.g., liquid, gas, and/or vapor-phase coolants, such as water, glycol etc.

Exemplary fluids available for use in the various thermal solution embodiments include: water (either purified or deionized), a glycol (e.g., ethylene glycol, propylene glycol), glycols mixed with water (e.g., ethylene glycol mixed with water (EGW) or propylene glycol mixed with water (PGW)), dielectric fluids (e.g. fluorocarbons, polyalphaolefin (PAO), isoparaffins, synthetic esters, or very high viscosity index (VHVI) oils), or mineral oils. Additionally, depending upon design and operating conditions, these fluids may be used in single-phase liquid, single-phase vapor, two-phase liquid/vapor or two-phase solid/liquid. All of these fluids and fluid mixtures will alter the thermohydraulic and heat transfer properties by altering the temperatures where phase change occurs, as well as meeting design temperature and pressure conditions for the component being cooled or warmed and the thermal solution being deployed. Additionally, multiple combinations of the fluid phases may be employed in various hybrid configurations to meet the particular cooling or warming needs of a respective implementation and still be within the scope of the contemplated embodiments.

Additionally, in some embodiments part or all the cooling is provided by gases. Exemplary gases include atmospheric air and/or one or more inert gases such as nitrogen. Atmospheric air may be taken to mean the mixture of different gases in Earth's atmosphere made up of about 78% nitrogen and 21% oxygen.

Depending on the design needs of a thermal solution system using the disclosed embodiments, engineered dielectric cooling fluids may be used. Some examples of dielectric fluids used for cooling semiconductors include: 3M™ Fluorinert™ Liquid FC-40—A non-flammable, dielectric fluid that can be used in direct contact with live electronics; 3M™ Novec™ Engineered Fluids-A non-flammable, dielectric fluid that can be used in direct contact with live electronics; Galden® PFPE (perfluoropolyether) products used as heat transfer fluids; EnSolv Fluoro HTF-A solvent with a high boiling point and low pour point that can be used for semiconductor wafer cooling. It is understood that in the selection of the cooling fluid, system design aspects such as operating temperatures and pressures, fluid flow rates, fluid viscosity, and other properties will require evaluation when selecting the appropriate cooling fluid.

In some embodiments, the cooling fluids may contain microparticles and/or nanoparticle additives to enhance the conductivity of the cooling fluid within the integrated cooling assemblies. Choi and Eastman (1995) from Argonne National Laboratory, U.S.A. (Yu et al., 2007) coined the word "nanofluid". Nanofluids are engineered fluids prepared by suspending the nano-sized (1-100 nm) particles of metals/non-metals and their oxide(s) with a base/conventional fluid. The suspension of high thermal conductivity metals/non-metals and their oxides nanoparticles enhances the thermal conductivity and heat transfer ability, etc. of the base fluid. The additives to the underlying cooling fluid may comprise for example, nanoparticles of carbon nanotube, nanoparticles of graphene, or nanoparticles of metal oxides. When the cooling fluid contains microparticles, the microparticles are typically 10 microns or less in diameter. Silicon oxide microparticles may be used.

The volume concentration of these micro or nanoparticles may be less than 1%, less than 0.2%, or less than 0.05%. Depending upon the liquid and micro/nanoparticle type chosen for the cooling fluid, higher volume concentrations of 10% or less, 5% or less, or 2% or less may be used. The cooling fluids may also contain small amounts of glycol or glycols (e.g. propylene glycol, ethylene glycol etc.) to reduce frictional shear stress and drag coefficient in the cooling fluid within the integrated cooling assembly. The availability of different base fluids (e.g., water, ethylene glycol, mineral or other stable oils, etc.) and different nanomaterials provide a variety of nanomaterial options for nanofluid solutions to be used in the various embodiments. These nanomaterial option groups such as aforementioned metals (e.g., Cu, Ag, Fe, Au, etc.), metal oxides (e.g., $TiO_2$, $Al_2O_3$, CuO, etc.), carbons (e.g. CNTS, graphene, diamond, graphite . . . , etc.), or a mixture of different types of nanomaterials. Metal nanoparticles (Cu, Ag, Au . . . ), metal oxide nanoparticles ($Al_2O_3$, $TiO_2$, CuO), and carbon-based nanoparticles are commonly employed elements. Silicon oxide nanoparticles may also be used. Using cooling fluids with micro and/or nanoparticles when practicing the various embodiments disclosed herein can result in increased heat removal efficiencies and effectiveness.

The fluid control design aspects of specific embodiments may require the nanofluids to be magnetic to facilitate either movement or cessation of movement of the fluids within the semiconductor structures. Magnetic nanofluids (MNFs) are suspensions of a non-magnetic base fluid and magnetic nanoparticles. Magnetic nanoparticles may be coated with surfactant layers such as oleic acid to reduce particle agglomeration and/or settling. Magnetic nanoparticles used in MNFs are usually made of metal materials (ferromagnetic materials) such as iron, nickel, cobalt, as well as their oxides such as spinel-type ferrites, magnetite ($Fe_3O_4$), and so forth. The magnetic nanoparticles used in MNFs typically range in size from about 1 to 100 nanometers (nm).

This disclosure describes embodiments involving the architecture of system and component elements that can be employed to provide for the cooling of semi-conductor components, packaging, and boards. However, those skilled in the art will appreciate the disclosed components and arrangements can be deployed and used in scenarios where component heat up or thermal warm up is desired for a component that is currently outside the low end of the desired operational range. Components that are outside the low end of their operational range can, if started in a cold environment, experience thermal warping or cracking up to and including thermal overexpansion and contact separation that may impair the successful operation of the system. Therefore, in these scenarios, the architectures and embodiments disclosed herein can be used where the indirect thermal solutions supporting them are repurposed or operated in a hybrid configuration to provide warming fluids or heat transfer media to accomplish the warm-up or heat-up scenario. These scenarios are controlled by systems not shown here to bring temperatures up at a speed or timing that enables the materials to avoid the excessive thermal expansion or unequal thermal expansion that may occur among the materials of the semiconductor or packaging being serviced by the thermal solution. Once the component or packaging is brought up into the normal operating range, it can be safely started and brought to a useful operational state.

Considering the warm-up or heat-up embodiments introduced above, the balance of this disclosure and terms used should be viewed in a light that also considers the design option for such warm-up or heat-up. Thus, where terms such as cooling channel, cooling chamber volume, and cooling opening are used, for example, such terms could also be considered as a thermal control channel, a thermal control volume, or a thermal control opening, respectively. A person of skill would understand that heat flux or heat transfer may go in a different direction, but the design concepts are similar and can be successfully employed in the various embodiments.

In some embodiments, a cooling channel is a liquid cooling channel and a liquid may flow through the liquid cooling channel. In some embodiments, the liquid may comprise a water and/or glycol (e.g., propylene glycol, ethylene glycol, and mixtures thereof).

As described below, coolant fluid flowing through a cold plate may be used to control the temperature of semiconductor devices. The fluid flowing across the surface of the semiconductor device absorbs heat and conducts heat away from the semiconductor device.

FIG. 1 is a schematic side view of a device package 10 and a heat sink 22 attached to the device package 10. The device package 10 typically includes a package substrate 12, a first device 14, a device stack 15, a heat spreader 18, and first TIM layers 16A, 16B thermally coupling the first device 14 and the device stack 15 to the heat spreader 18. The device package 10 is thermally coupled to the heat sink 22 through a second TIM layer 20. The TIM layers 16A, 16B, 20 facilitate thermal contact between components in the device package 10 and between the device package 10 and the heat sink 22.

As heat flux density increases with increasing power density in advanced semiconductor devices, the cumulative thermal resistance of the system illustrated in FIG. 1 is increasingly problematic as heat cannot be dissipated quickly enough to allow semiconductor devices to run at optimal power. Consequently, the energy efficiency of semiconductor devices is reduced. Furthermore, heat is transferred between semiconductor devices within the device package 10, as shown with heat transfer path 24 (illustrated as a dashed line), where heat may be undesirable transferred from the first device 14 having a high heat flux, such as a central processing unit (CPU) or a graphical processing unit (GPU), to the device stack 15 having low heat flux, such as memory, through the heat spreader 18.

For example, as shown in FIG. 1, each device package component and the respective interfacial boundaries therebetween has a corresponding thermal resistance which forms heat transfer path 26 (illustrated by arrow 26 in FIG. 1). The left-hand side of FIG. 1 illustrates the heat transfer path 26 as a series of thermal resistances R1-R8 between a heat source and a heat sink. Here, R1 is the thermal resistance of the bulk semiconductor material of the first device 14. R3 and R7 are the thermal resistances of the first TIM layers 16A, 16B and the second TIM layer 20, respectively. R5 is the thermal resistance of the heat spreader 18. R2, R4, R6, and R8 represent the thermal resistance at the interfacial region of the components (e.g., contact resistances). In a typical cooling system, R3 and R7 may account for 80% or more of the cumulative thermal resistance of the heat transfer path 26 and R5 may account for 5% or more. R1 of the first device 14 and R2, R4, R6, and R8 of the interfaces account for the remaining cumulative thermal resistance. Accordingly, embodiments described herein provide for integrated cooling assemblies embedded within a device package. The embedded cooling assemblies shorten the thermal resistance path between a semiconductor device and a heat sink and reduce thermal communication between semiconductor devices disposed in the same device package, such as described in relation to the figures below.

Figure 2A:
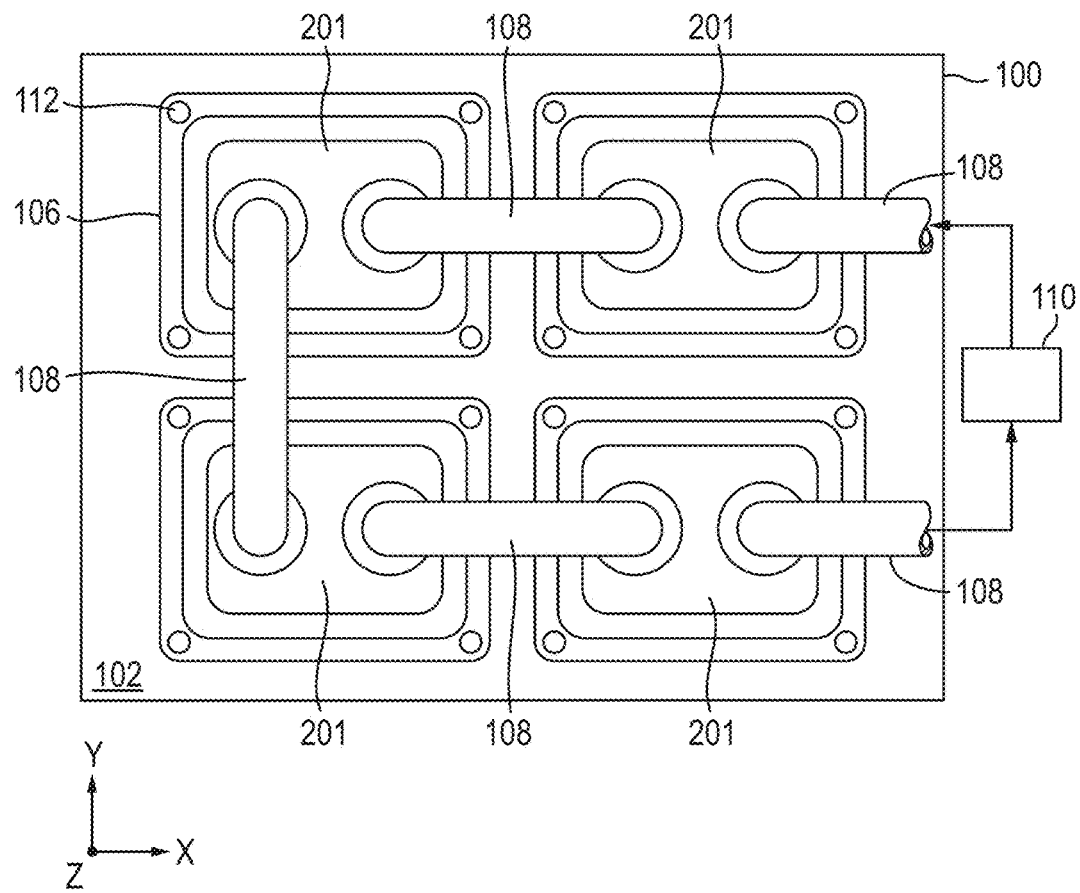
FIG. 2A is a schematic plan view of an example of a system panel, in accordance with embodiments of the present disclosure.

FIG. 2A is a schematic plan view of an example of a system panel 100 in accordance with embodiments of the present disclosure. Generally, the system panel 100 includes a printed circuit board, here a PCB 102, a plurality of device packages 201 mounted to the PCB 102, and a plurality of coolant lines 108 fluidly coupling each of the device packages 201 to a coolant source 110. It is contemplated that coolant fluid may be delivered to each of the device packages 201 in any desired fluid phase, e.g., liquid, vapor, gas, or combinations thereof and may flow out from each device package 201 in the same phase or a different phase. In some embodiments, the coolant fluid is delivered to the device packages 201 and returned therefrom as a liquid, whereby the coolant source 110 may comprise a heat exchanger or chiller to maintain the coolant fluid at a desired temperature. In other embodiments, the coolant fluid may be delivered to the device packages 201 as a liquid, vaporized to a vapor within the device packages 201, and returned to the coolant source 110 as a vapor. In those embodiments, the device packages 201 may be fluidly coupled to the coolant source 110 in parallel and the coolant source 110 may include or further include a compressor (not shown) for condensing the received vapor to a liquid form.

Figure 2B:
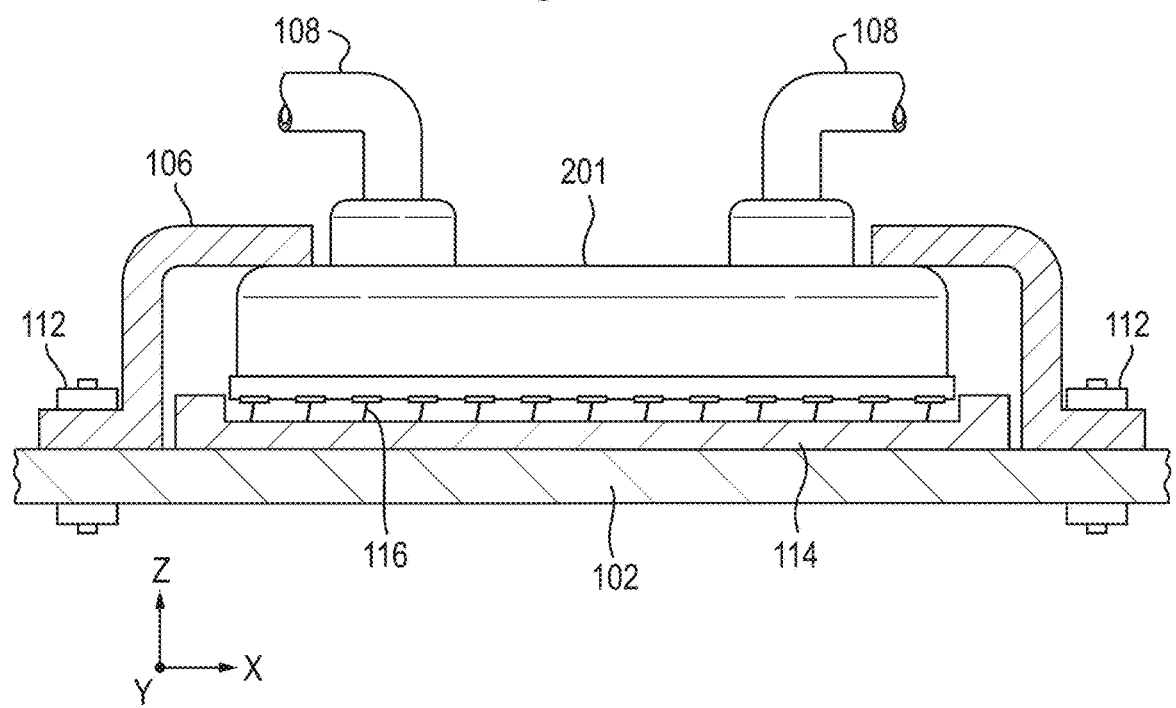
FIG. 2B is a schematic partial sectional side view of a device package mounted on a PCB, in accordance with embodiments of the present disclosure.

FIG. 2B is a schematic partial sectional side view of a portion of the system panel 100 of FIG. 2A. As shown, each device package 201 is fluidly coupled to the plurality of coolant lines 108 and is disposed in a socket 114 of the PCB 102 and connected thereto using a plurality of pins 116, or by other suitable connection methods, such as solder bumps (not shown). The device package 201 may be seated in the socket 114 and secured to the PCB 102 using a mounting frame 106 and a plurality of fasteners 112, e.g., compression screws, collectively configured to exert a relatively uniform downward force on the upward facing edges of the device package 201. The uniform downward force ensures proper pin contact between the device package 201 and the socket 114.

Figure 2C:
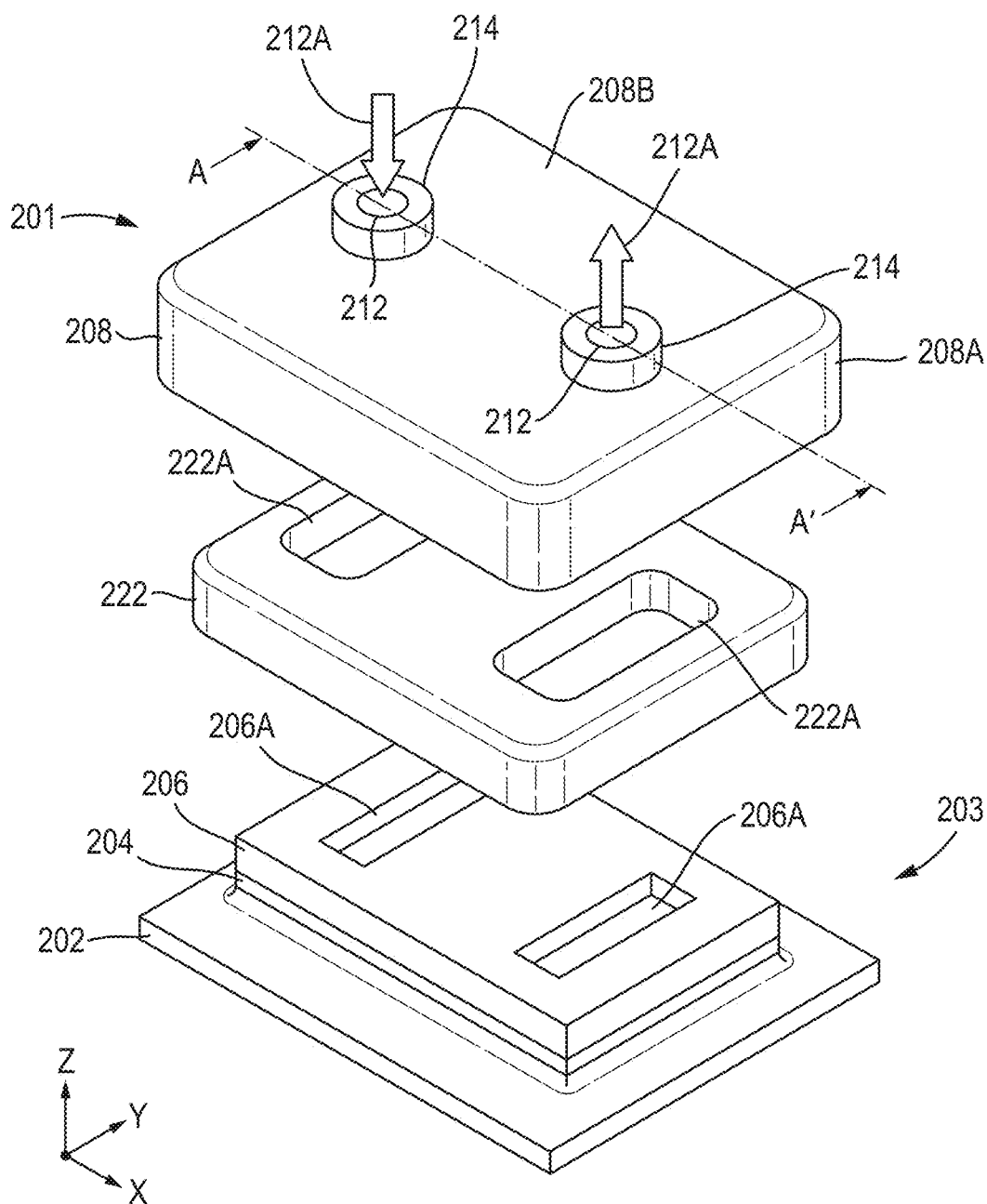
FIG. 2C is a schematic exploded isometric view of an example device package in accordance with embodiments of the present disclosure.

FIG. 2C is a schematic exploded isometric view of an example device package 201 in accordance with embodiments of the present disclosure. Generally, the device package 201 includes a package substrate 202, an integrated cooling assembly 203 disposed on the package substrate 202, and a package cover 208 disposed on a peripheral portion of the package substrate 202. Suitable materials that may be used in the package cover 208 include copper, aluminum, metal alloys, etc. The package cover 208 extends over the integrated cooling assembly 203 so that the integrated cooling assembly 203 is disposed between the package substrate 202 and the package cover 208. The integrated cooling assembly 203 typically includes a semiconductor device 204 and a cold plate 206 bonded to the semiconductor device 204. In some embodiments, the cold plate 206 may comprise substrate material like silicon, glass, ceramic, etc. Although the lateral dimensions (or footprint) of the cold plate 206 is shown to be the same or similar to the lateral dimensions (or footprint) of the semiconductor device 204, the footprint of the cold plate 206 may be smaller or larger in one or both directions when compared to the footprint of the semiconductor device 204.

As shown, the device package 201 further includes a sealing material layer 222 that forms a coolant fluid impermeable barrier between the package cover 208 to the integrated cooling assembly 203 that prevents leaking of the coolant fluid outside of the cooling assembly and prevents coolant fluid from reaching an active side 218 (discussed below in relation to FIG. 3) of the semiconductor device 204 and causing damage thereto. In some embodiments, the sealing material layer 222 comprises an adhesive material that reliably attaches the package cover 208 to the integrated cooling assembly 203. In some embodiments, the sealing material layer 222 comprises a polymer or epoxy material that extends upwardly from the package substrate 202 to encapsulate and/or surround at least a portion of the semiconductor device 204. In some embodiments, the sealing material layer 222 may also comprise conductive material, e.g., solder. In other embodiments, the sealing material layer 222 is formed from a molding compound, e.g., a thermoset resin, that when polymerized, forms a hermetic seal between the package cover 208 and the cold plate 206. Here, the coolant fluid is delivered to the cold plate 206 through openings 222A disposed through the sealing material layer 222. As shown, the openings 222A are respectively in registration and fluid communication with inlet and outlet openings 212 of the package cover 208 thereabove and inlet and outlet openings 206A in the cold plate 206 therebelow.

Generally, the package substrate 202 includes a rigid material, such as an epoxy or resin-based laminate, that supports the integrated cooling assembly 203 and the package cover 208. The package substrate 202 may include conductive features disposed in or on the rigid material that electrically couple the integrated cooling assembly 203 to a system panel, such as the PCB 102.

Figure 3A:
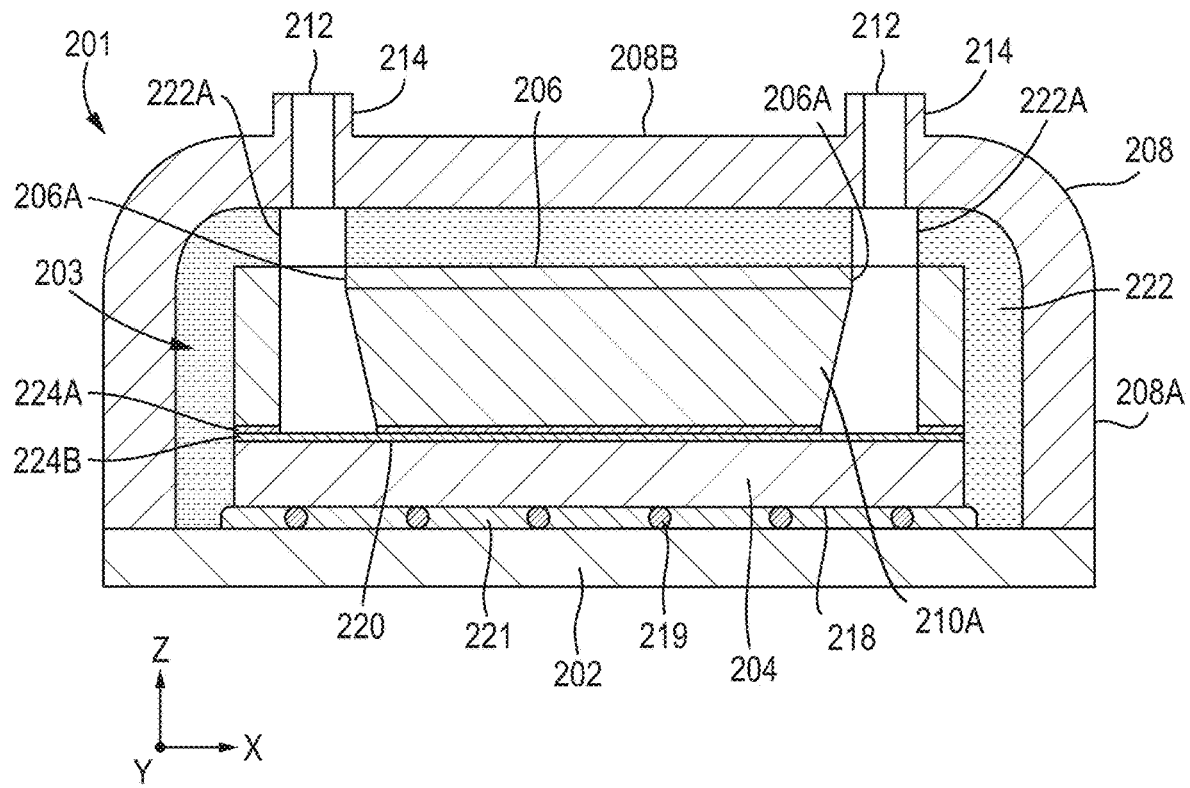
FIG. 3A is a schematic sectional view of an example device package, in accordance with embodiments of the present disclosure, that may be used with the system panel.

FIG. 3A is a schematic sectional view in the X-Z plane of the device package 201 taken along line A-A' of FIG. 2C. As illustrated in FIG. 3A, the semiconductor device 204 includes the active side 218 that includes device components, e.g., transistors, resistors, and capacitors, formed thereon or therein, and a non-active side, here the semiconductor device backside 220, opposite the active side 218. As shown, the active side 218 is positioned adjacent to and facing towards the package substrate 202. The active side 218 may be electrically connected to the package substrate 202 by use of conductive bumps 219, which are encapsulated by a first underfill layer 221 disposed between the semiconductor device 204 and the package substrate 202. The first underfill layer 221 may comprise a cured polymer resin or epoxy, which provides mechanical support to the conductive bumps 219 and protects against thermal fatigue. In some embodiments, the active side 218 may be electrically connected to another package substrate, another active die, or another passive die (e.g., interposer) using hybrid bonding or conductive bumps 219. The cold plate 206 may be disposed above the package substrate 202 with the semiconductor device 204 disposed therebetween. For example, the semiconductor device 204 (and the first underfill layer 221) may be disposed between the cold plate 206 and the package substrate 202. In some embodiments, the cold plate 206 may be disposed directly on the package substrate 202.

In some embodiments, the backside 220 of the semiconductor device 204 comprises a corrosion protective layer (not shown). The corrosion protective layer may be a continuous layer disposed across the entire backside 220 of the semiconductor device 204, such that the cold plate 206 is attached thereto. Beneficially, the corrosion protective layer provides a corrosion resistant barrier layer, thus preventing undesired corrosion of the semiconductor device 204 (e.g., the semiconductor substrate material which might otherwise be in direct contact with coolant fluid flowing through coolant channels 210A, 210B).

The coolant channels may extend between a single inlet opening and a single outlet opening of the cold plate 206, such that the coolant channels share the same inlet and outlet openings. In some embodiments, multiple inlet and/or outlet openings may be coupled to the coolant channels.

In some embodiments each coolant channel may be connected between a separate inlet opening and a separate outlet opening. In such embodiments, the coolant fluid may be directed to the separate inlet openings and from the separate outlet openings using a manifold disposed above the openings in the Z-axis direction.

In some embodiments, a height in the Z-axis direction of the coolant channels may be greater than 100 μm, 100 μm-1000 μm, or 100 μm-700 μm. A width in the Y-axis direction of the coolant channels may be greater than 100 μm, 100 μm-1000 μm, or 100 μm-700 μm. For example, the width of the coolant channels may be greater than the height. A cross-section of the coolant channels in the Y-Z plane is wide enough to allow for a pressure drop of 0-20 psi, 3-15 psi, 4-10 psi.

In some embodiments, preparing a desired surface roughness of the sidewalls of the coolant channels may include depositing an organic layer on a photoresist layer after cold plate features have been etched to form a micro-masking layer, such as between 1 to 30 nm. The micro-masking layer may be dry etched to form the desired surface roughness, such as between 0.1 to 3.0 nm.

With reference to FIG. 3A, the cold plate 206 is attached to the backside 220 of the device 204 without the use of an intervening adhesive, e.g., the cold plate 206 may be directly bonded to the backside 220 of the device 204, such that the cold plate 206 and the backside 220 of the device 204 are in direct contact. For example, in some embodiments, one or both of the cold plate 206 and the backside 220 of the semiconductor device 204 may comprise a dielectric material layer, e.g., a first dielectric material layer 224A and a second dielectric material layer 224B respectively, and the cold plate 206 is directly bonded to the backside 220 of the semiconductor device 204 through bonds formed between the dielectric material layers 224A, 224B. In some embodiments, one of the cold plate 206 or the backside 220 of the semiconductor device 204 may comprise a thin bonding dielectric layer (e.g., silicon nitride, etc.) and other element(s) may not include any such explicit bonding dielectric layer (or can have only native oxide layer). Here, the first and second dielectric material layers 224A, 224B are illustrated as continuous layers, but it will be understood that one or both of the layers may not be continuous. For example, the first dielectric material layer 224A may be disposed only on lower surfaces of the cold plate 206 facing the backside 220 of the semiconductor device 204. With reference again to FIG. 3A, portions of the first dielectric material layer 224A may be disposed only on lower surfaces of dividers 230. Beneficially, directly bonding the cold plate 206 to the semiconductor device 204, as described above, reduces the thermal resistance therebetween and increases the efficiency of heat transfer from the semiconductor device 204 to the cold plate 206.

Figure 3B:
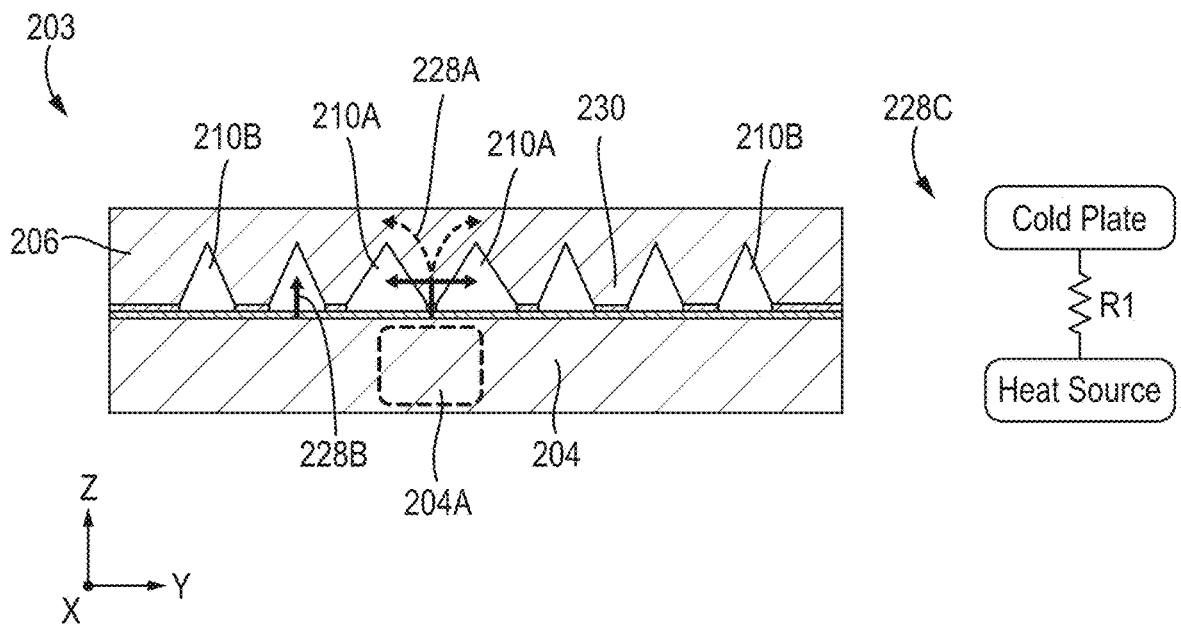
FIG. 3B is a schematic sectional view of the integrated cooling assembly of the device package, according to some embodiments of the present disclosure.

FIG. 3B is a schematic sectional view in the Y-Z plane of the integrated cooling assembly 203. In FIG. 3B, the cold plate 206 comprises a patterned side that faces towards the semiconductor device 204 and an opposite side that faces towards the package cover 208 (not shown). The patterned side comprises coolant channels 210A, 210B, which extend laterally between the inlet and outlet openings 206A of the cold plate 206. Each coolant channel 210A, 210B comprises cavity sidewalls which define a corresponding coolant channel 210A, 210B therebetween. Portions of the cold plate 206 between the cavity sidewalls form dividers 230.

With reference to FIGS. 3A and 3B, a cross-section in the X-Z plane of the coolant channels 210A, 210B may be triangular. The coolant channels 210A, 210B may in some examples take a trapezoid shape in the X-Z plane. The coolant channels 210A, 210B having a triangular cross-section may present an advantage over coolant channels having a trapezoidal cross-section because an increased number of coolant channels 210A, 210B having triangular cross-sections may be accommodated in the cold plate 206 as compared to coolant channels having a trapezoidal cross-section, giving rise to a greater perimeter of coolant channels and therefore a greater surface area available for a cooling interface between a semiconductor device 204 and a coolant in the coolant channel 210A, 210B.

The coolant channels 210A, 210B may comprise a first coolant channel 210A and a second coolant channel 210B. A width of the first coolant channel 210A may be greater than a width of the second coolant channel 210B in the Z-Y plane. The first coolant channel 210A may be disposed above (i.e., partially overlap) a hotspot region 204A of the semiconductor device 204. The second coolant channel 210B may be disposed above (i.e., partially overlap) an adjacent region 204B of the semiconductor device 204. In operation, a power density of the hotspot region 204A is greater than an average power density of the semiconductor device 204. A power density may be defined as an amount of power that is handled per unit area at a particular point or area of the semiconductor device 204. Generally, a higher power density results in a higher generated heat.

The hotspot region 204A may be caused by active circuitry (i.e., transistors) on the active side 218 of the semiconductor device 204 which gives rise to a region of the backside 220 of the device having a higher temperature, such that the hotspot region 204A may be manifested as an area of the backside 220 of the semiconductor device 204 having an increased temperature as compared to the rest of the backside 220 of the semiconductor device. Therefore, in some embodiments, the hotspot region 204A may be taken to mean a region of the active side 218 of the semiconductor device 204. As described herein, in some embodiments a particular portion of the cold plate 206 is aligned with the region of the backside 220 of the semiconductor device 204 which exhibits an increased temperature as compared to the rest of the backside 220 of the semiconductor device which corresponds to the hotspot region 204A.

The adjacent region 204B may be any region of the backside 220 of the semiconductor device 204 which is not determined to be a hotspot region 204A. A hotspot may be taken to mean an amount of heat energy passing through a certain surface which exceeds a threshold. Alternatively, a hotspot may be taken to mean a portion of a surface having a measurable temperature which exceeds a threshold. The heat energy may be measured as heat flux (or thermal flux) using thermal analysis methods such as microthermography. Here, the hotspot region 204A may be taken to mean a region of the backside 220 (i.e., surface) of the semiconductor device 204 at which an amount of heat energy is measured to exceed a threshold. The threshold may be relative to an amount of heat energy passing through the adjacent region 204B. For example, a region of the backside 220 may be determined to be the hotspot region 204A if the amount of thermal flux measured at that region exceeds the amount of thermal flux measured at the adjacent region 204B. Alternatively, the hotspot region 204A may be determined as any region of the backside 220 which exceeds a threshold temperature (e.g., 60° C., 75° C. or 90° C.).

It will be understood that a hotspot region may not be defined by a single uniform temperature measured within a predefined perimeter. A hotspot region may comprise a hottest portion (e.g., central portion) at which a measured temperature is highest and contours of temperatures surrounding the central portion. For example, a temperature gradient of the hotspot region may be highest in the central portion and gradually reduce towards edges of the hotspot region. Furthermore, a hotspot region may not have a fixed perimeter and edges of a hotspot region may not be defined by a regular shape. That is, as the thermal flux generated by a hotspot region fluctuates, the hotspot region may grow and reduce is size and shape. Therefore, a hotspot region may be any shape having a hottest portion (e.g., central portion) with a temperature that exceeds a threshold, as discussed above.

The hotspot region 204A may be a region exposed to higher thermal energy relative to at least one other region of the device 204, for example the adjacent region 204B. The hotspot region 204A may have an associated first temperature when the device 204 is in use and the adjacent region 204B may have an associated second temperature when the device 204 is in use. The first temperature may be higher than the second temperature. For example, the first temperature may be 70° C. and the second temperature may be 45° C. It will be understood that the difference between the first and second temperatures may vary according to the operating conditions and the types of components operating in the different regions.

The heat energy passing through and/or measured at the backside 220 may be generated by components of the semiconductor device 204. That is, electronic components may be positioned adjacent to the backside 220 within the semiconductor device 204 such that heat energy generated by the electronic components dissipates into and/or through the structure of the backside 220 as the electronic components function. For example, the hotspot region 204A may comprise one or more electronic components with a relatively high power dissipation rate, such as a processing units like a computational core, a neural core or a graphical processing unit. In such embodiments, the inlet opening of the cold plate may be disposed over (i.e., overlap) or slightly offset from the processing unit (e.g., processing core region, CPU, GPU, neural processing unit (NPU), tensor processing unit (TPU), etc.) of a semiconductor device to which the cold plate is attached. Such core regions may generally have higher power and thermal density than the adjacent regions of a semiconductor device.

On the other hand, the adjacent region 204B may comprise one or more electronic components with a relatively low power dissipation rate, such as a memory unit, an input/output unit (hereinafter "I/O unit"), Physical Layer (PHY) unit or analog unit. In other examples, the adjacent region 204B may comprise no electronic component therein. In some examples, memory units (e.g., cache, Static random-access memory (SRAM), Dynamic random-access memory (DRAM), Random Access Memory (RAM)) may also be considered to be hotspot regions.

The dividers 230 may extend to the backside 220 of the semiconductor device 204 and take a trapezoid shape in the X-Z plane. The dividers 230 provide structural support to the integrated cooling assembly 203 and disrupt laminar fluid flow at the interface of the coolant and the device backside 220, resulting in increased heat transfer therebetween. Furthermore, by introducing plural coolant channels 210A, 210B to define separate coolant flow paths, an internal surface area of the cold plate 206 is increased, which further increases the efficiency of heat transfer. It can be seen that a lower surface of the dividers 230 are in thermal contact with the backside of the semiconductor device 204 so that heat may transfer away from the semiconductor device 204 to the body of the dividers 230 and the cold plate 206. The dividers 230 may alternatively be referred to as support features supporting the cold plate 206.

In FIG. 3B, arrows 228A and 228B illustrate two different heat transfer paths in the integrated cooling assembly 203. A first heat transfer path illustrated by arrow 228B shows heat generated by the semiconductor device 204, and more specifically the hotspot region 204A, transferring directly from the semiconductor material of the semiconductor device 204 to coolant fluid flowing through the cold plate 206. A second heat transfer path illustrated by arrows 228A shows heat generated by the semiconductor device 204 being transferred from semiconductor material (e.g., silicon material) of the semiconductor device 204 to semiconductor material (e.g., silicon material) of the cold plate 206 structure, propagated throughout the semiconductor material of the cold plate 206 structure (shown as dashed lines), and being transferring into coolant fluid flowing through the cold plate 206. A thermal resistance of the first and second heat transfer paths 228A, 228B is illustrated by heat transfer path 228C, which is shown as thermal resistance R1 between a heat source and a cold plate. Here, R1 is the thermal resistance of the bulk semiconductor material of the semiconductor device 204. It can be seen that the heat transfer path 228C of the integrated cooling assembly 203 is reduced compared to the heat transfer path 26 of the device package 10 of FIG. 1, due to the direct bonding discussed above.

In some embodiments, the cold plate 206 may be attached to the semiconductor device 204 using a hybrid bonding technique, where bonds are formed between the dielectric material layers 224A, 224B and between metal features, such as between first metal pads and second metal pads, disposed in the dielectric material layers 224A, 224B.

Suitable dielectrics that may be used as the dielectric material layers 224A, 224B include silicon oxides, silicon nitrides, silicon oxynitrides, silicon carbon nitrides, metal-oxides, metal-nitrides, silicon carbide, silicon oxycarbides, silicon oxycarbonitride, diamond-like carbon (DLC), or combinations thereof. In some embodiments, one or both of the dielectric material layers 224A, 224B are formed of an inorganic dielectric material, e.g., a dielectric material substantially free of organic polymers. Typically, one or both of the dielectric layers are deposited to a thickness greater than the thickness of a native oxide, such as about 1 nanometer (nm) or more, 5 nm or more, 10 nm or more, 50 nm or more, or 100 nm or more. In some embodiments, one or both of the layers are deposited to a thickness of 3 micrometer or less, 1 micrometer or less, 500 nm or less, such as 100 nm or less, or 50 nm or less. The dielectric layer material and thickness may be optimized for lower thermal resistance between the die and the cold plate.

The cold plate 206 may be formed of any suitable material that has sufficient structural strength to withstand the desired pressures of coolant flowing into the coolant channels 210A, 210B. For example, the cold plate 206 may be formed of semiconductor material like silicon or other engineered materials like glass. In other examples, the cold plate 206 may be formed of a material selected from a group comprising polymers, metals, ceramics, or composites thereof. In some embodiments, the cold plate 206 may be formed of stainless steel (e.g., from a stainless steel metal sheet) or a sapphire plate.

In some embodiments, the cold plate 206 may be formed of a bulk material having a substantially similar coefficient of thermal expansion (CTE) to the bulk material of the substrate 202, where the CTE is a fractional change in length of the material (in the X-Y plane) per degree of temperature change. In some embodiments, the CTEs of the cold plate 206 and the substrate 202 are matched so that the CTE of the substrate 202 is within about +/−20% or less of the CTE of the cold plate 206, such as within +/−15% or less, within +/−10% or less, or within about +/−5% or less when measured across a desired temperature range. In some embodiments, the CTEs are matched across a temperature range from about −60° C. to about 100° C. or from about −60° C. to about 175° C. In one example embodiment, the matched CTE materials each include silicon.

In some embodiments, the cold plate 206 may be formed of a material having a substantially different CTE from the semiconductor device 204, e.g., a CTE mismatched material. In such embodiments, the cold plate 206 may be attached to the semiconductor device 204 by a compliant adhesive layer (not shown) or a molding material that absorbs the difference in expansion between the cold plate 206 and the semiconductor device 204 across repeated thermal cycles.

The package cover 208 generally comprises one or more vertical or sloped sidewall portions 208A and a lateral portion 208B that spans and connects the sidewall portions 208A. The sidewall portions 208A may extend upwardly from a peripheral surface of the package substrate 202 to surround the device 204 and the cold plate 206 disposed thereon. The lateral portion 208B may be disposed over the cold plate 206 and is typically spaced apart from the cold plate 206 by a gap corresponding to the thickness of the sealing material layer 222. Coolant is circulated through the coolant channels 210A, 210B through the inlet and outlet openings 212 of the package cover 208 formed through the lateral portion 208B. The inlet and outlet openings 206A of the cold pate 206 may be in fluid communication with the inlet and outlet openings 212 of the package cover 208 through the inlet and outlet openings 222A formed in the sealing material layer 222 disposed therebetween. In certain embodiments, coolant lines 108 (FIGS. 2A-2B) may be attached to the device package 201 by use of connector features formed in the package cover 208, such as threads formed in the sidewalls of the inlet and outlet openings 212 of the package cover 208 and/or protruding features 214 that surround the inlet and outlet openings 212 and extend upwardly from a surface of the lateral portion 208B.

Typically, the package cover 208 is formed of semi-rigid or rigid material so that at least a portion of the downward force exerted on the package cover 208 by the mounting frame is transferred to a supporting surface of the package substrate 202 and not transferred to the cold plate 206 and the semiconductor device 204 therebelow. In some embodiments, the package cover 208 is formed of a thermally conductive metal, such as aluminum or copper. In such embodiments, the package cover 208 functions as a heat spreader that redistributes heat from one or more electronic components of the semiconductor device 204.

It should be noted that the direction in which the coolant fluid flows through the cold plate 206 may be controlled depending on the relative locations of the inlet and outlet openings. For example, the coolant fluid may flow from left to right in the device package 201 of FIG. 3 when the inlet openings 212, 222A, 206A of the package cover 208, the sealing material layer 222, and the cold plate 206, respectively, are located on the left-hand side of the device package 201 and the outlet openings 212, 222A, 206A of the package cover 208, the sealing material layer 222, and the cold plate 206, respectively, are located on the right-hand side of the device package 201. Alternatively, the coolant fluid may flow from right to left in the device package 201 illustrated in FIG. 3 when the outlet openings 212, 222A, 206A of the package cover 208, the sealing material layer 222, and the cold plate 206 are located on the left-hand side of the device package 201 and the inlet openings 212, 222A, 206A of the package cover 208, the sealing material layer 222, and the cold plate 206 are located on the right-hand side of the device package 201. Although only one set of inlet and outlet openings are shown and described here, additional inlet and outlet openings may also be provided at various locations on the package cover 208, the sealing material layer 222, and the cold plate 206.

Figure 3C:
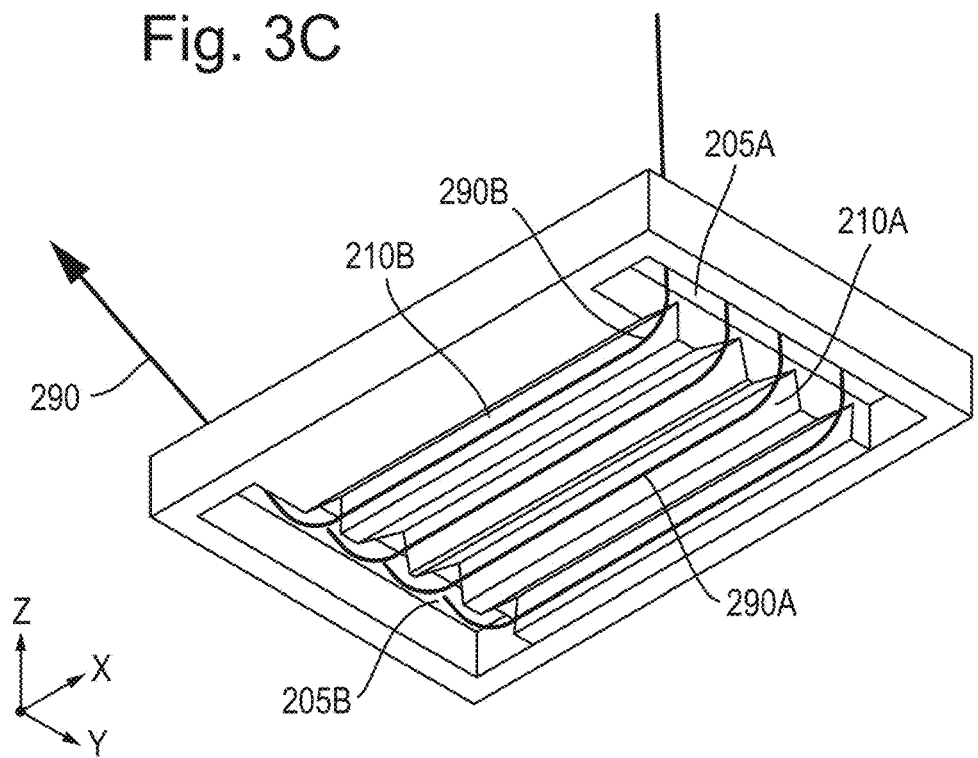
FIG. 3C shows an isometric view of the integrated cooling assembly of the device package, according to some embodiments of the present disclosure.

FIG. 3C shows an isometric view of the cold plate 206. An example fluid flow path is illustrated by arrow 290. The inlet and outlet openings 206A in the cold plate 206 may comprise an inlet opening 205A and an outlet opening 205B.

The inlet and outlet openings 205A, 205B of the cold plate 206 may form an elongated shape extending from one side of the cold plate 206 to another side of the cold plate 206. The inlet and outlet openings 205A, 206B of the cold plate 206 comprising an elongated shape may comprise a length and a width in the plane shown in FIG. 3D. The length may be greater than the width and may span across the width of the cold plate 206.

The fluid flow path of the coolant fluid through the coolant channels 210A, 210B may be as follows:
1. Coolant fluid enters the coolant channels 210A, 210B through the inlet opening 205A.
2. Coolant fluid flows across the inside surfaces of the cold plate 206 and absorbs heat generated by the semiconductor device 204 which has dissipated into the cold plate 206 structure. The coolant fluid may also flow directly across the backside 220 of the semiconductor device 204 to absorb heat energy directly from the semiconductor device 204. The coolant channels 210A, 210B may be formed to direct the coolant fluid flow from inlet opening(s) to outlet opening(s) and facilitate heat extraction from the semiconductor device 204 by the coolant fluid. A first portion 290A of the fluid flow path 290 passes through the first coolant channel 210A, a second portion 290B of the fluid flow path 290 passes through the second coolant channel 210B. The first portion 290A may be larger than the second portion 290A because the first coolant channel 210A comprises a greater channel width (e.g., a greater channel volume) than the second coolant channel 210B. In some embodiments, the coolant fluid may be in direct contact with the backside 220 of the semiconductor device 204 or via one or more substrate or layers between the coolant fluid or backside 220 of the semiconductor device 204.

3. Coolant fluid exits the coolant channels 210A, 210B through the outlet opening 205B.

It will be understood from the above flow path that heat is extracted without introducing an unnecessary thermal resistance (e.g., a TIM disposed between the backside 220 of the semiconductor device 204 and the cold plate 206) between the backside 220 of the semiconductor device 204 and the cold plate 206.

Figure 3D:
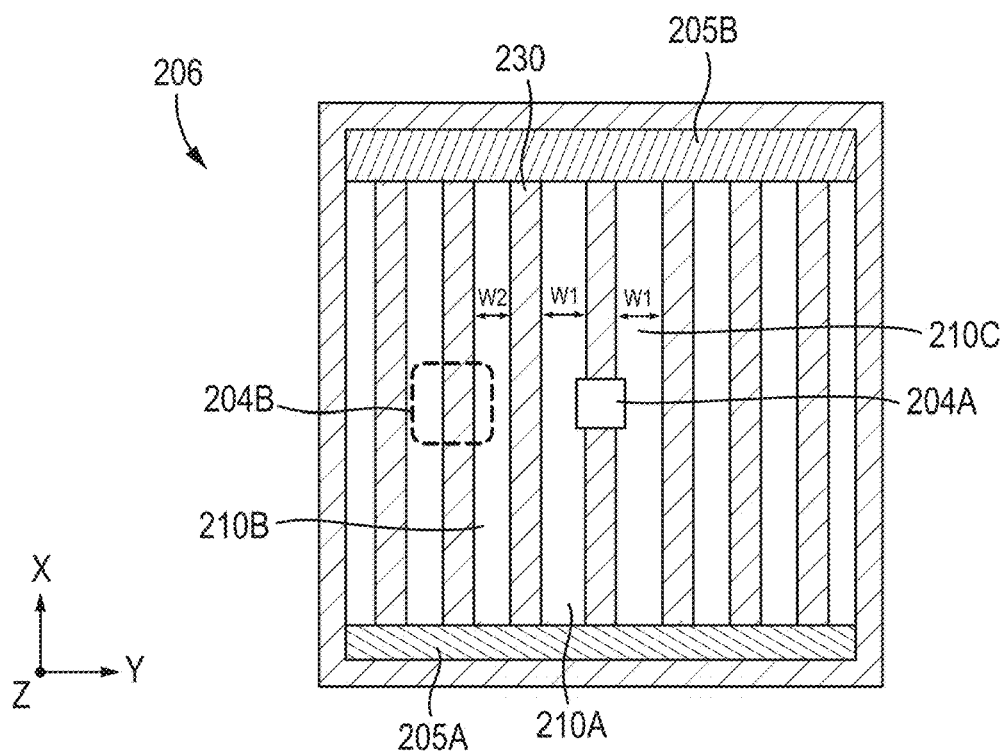
FIG. 3D shows a cold plate of the integrated cooling assembly according to one or more embodiments of the present disclosure.

FIG. 3D shows a bottom view of the cold plate 206 in the X-Y plane of FIG. 3A. The first coolant channel 210A and the second coolant channel 210B may extend laterally between the inlet opening 205A and the outlet opening 205B. The cold plate 206 may comprise a third coolant channel 210C identical to the first coolant channel 210A. The first coolant channel 210A may be adjacent to the second coolant channel 210B. The first coolant channel 210A may be disposed between the second coolant channel 210B and the third coolant channel 210C. The first coolant channel 210A may comprise a channel width W1 greater than a channel width W2 of the second coolant channel 210B in a direction parallel to the backside of the semiconductor device 204. The widths W1, W2 may extend in the Y-axis direction as shown on FIG. 3D. The block 204A represent the hotspot region of the semiconductor device 204 when the cold plate is bonded to the semiconductor device 204. A portion of the first coolant channel 210A and the third coolant channel 210C may be disposed above (i.e., at least partially overlap or be laterally offset from) the hotspot region 204A of the semiconductor device 204. In some embodiments, the portion of the first coolant channel 210A and the third coolant channel 210C may fully overlap (and align with) the hotspot region 204A. A lateral distance in the Y-axis direction between the hotspot region 204A and a midpoint of the first coolant channel 210A may be less than a lateral distance between a midpoint of the second coolant channel 210B and the hotspot region 204A in the same direction. A midpoint of a coolant channel may be taken to mean a region of the coolant channel substantially half way between the inlet and outlet openings to which the coolant channel is fluidly connected.

The adjacent region 204B is shown by the block 204B. The adjacent region 204B may be any region of the backside 220 of the semiconductor device 204 which is not determined to be a hotspot region.

Although the hotspot region 204A is shown to be at a central portion of the semiconductor device 204, it should be appreciated that this is exemplary and in other embodiments the hotspot region 204A may be at any region of the semiconductor device and may comprise any size or shape.

The variation in the width W1, W2 of the first, second and third coolant channels may facilitate delivery of a higher proportion of a coolant fluid to the hotspot region 204A compared to other regions associated with narrower coolant channels. The width W1 provides a greater volume for a fixed channel height as compared to the width W2. This may allow a higher flow rate of coolant fluid through the first and third coolant channels. Additionally, greater portion of the backside is exposed to coolant due to the greater width W1. Additionally, providing dedicated cooling channels for the hotspot region 204A which have a relatively larger volume increases the flow rate of coolant fluid through those dedicated channel, which thereby increases cooling efficiency at the hotspot region 204A. The flow rates for each coolant channel can be determined based on actual semiconductor device layout and system requirements.

Figure 4:
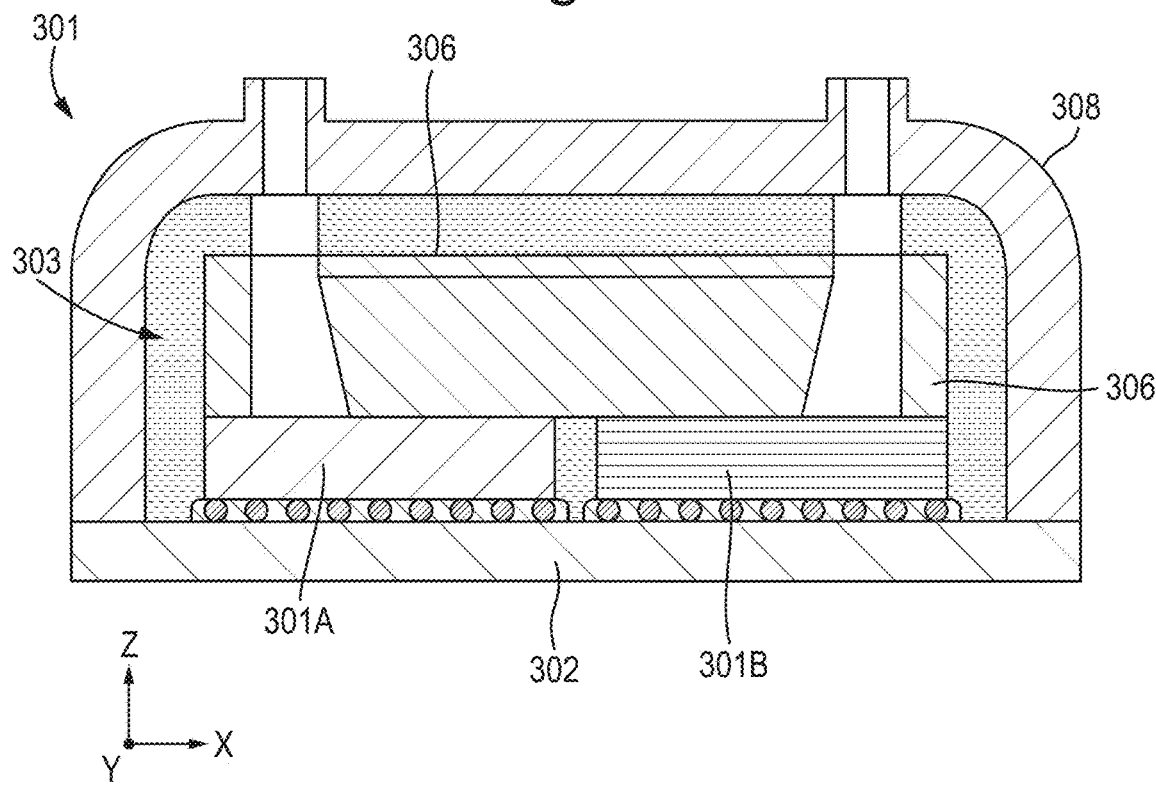
FIG. 4 is a schematic sectional view of another integrated cooling assembly of the device package, according to some embodiments of the present disclosure.

FIG. 4 is a schematic side sectional view in the X-Z plane of an example of a multi-component device package 301 that includes a cold plate 306 directly bonded to the backside surfaces of two or more devices 301A, 301B. The multi-component device package 301 may be similar to the device package 201 described above, and therefore the description of similar features is omitted for brevity. In some embodiments, the two or more devices 301A and 301B are reconstituted and then bonded to the cold plate 306. As shown, the device package 301 includes a package substrate 302, an integrated cooling assembly 303 and a package cover 308. The integrated cooling assembly 303 may include a plurality of devices 301A (one shown) which may be singulated and/or disposed in a vertical device stack 301B (one shown). The cold plate 306 may be attached to each of the devices 301A and device stack 301B, e.g., by the direct bonding methods described herein or other method including flip chip bonding, etc. In some embodiments, the device 301A may comprise a processor and the device stack 301B may comprise a plurality of memory devices. Here, the device 301A and the device stack 301B are disposed in a side-by-side arrangement on the package substrate 302 and are in electrical communication with one another through conductive elements formed in, on, or through the package substrate 302. Here, the cold plate 306 is sized to provide a bonding surface for attachment to both the device 301A and the device stack 301B but may otherwise be the same or substantially similar to other cold plates described herein. In some embodiment, the lateral dimensions (or footprint) of the cold plate 306 may be smaller or larger than the combined lateral dimensions (or footprint) of both the device 301A and the device stack 301B. In some embodiments, one or more sidewalls of the cold plate 306 may be aligned or offset to the vertical sidewalls of the device 301A and the device stack 301B (including inside or outside their footprint). In some embodiment, more than one cold plate 306 may be bonded. For example, separate cold plates may be bonded to the device 301A and the device stack 301B.

Figure 5:
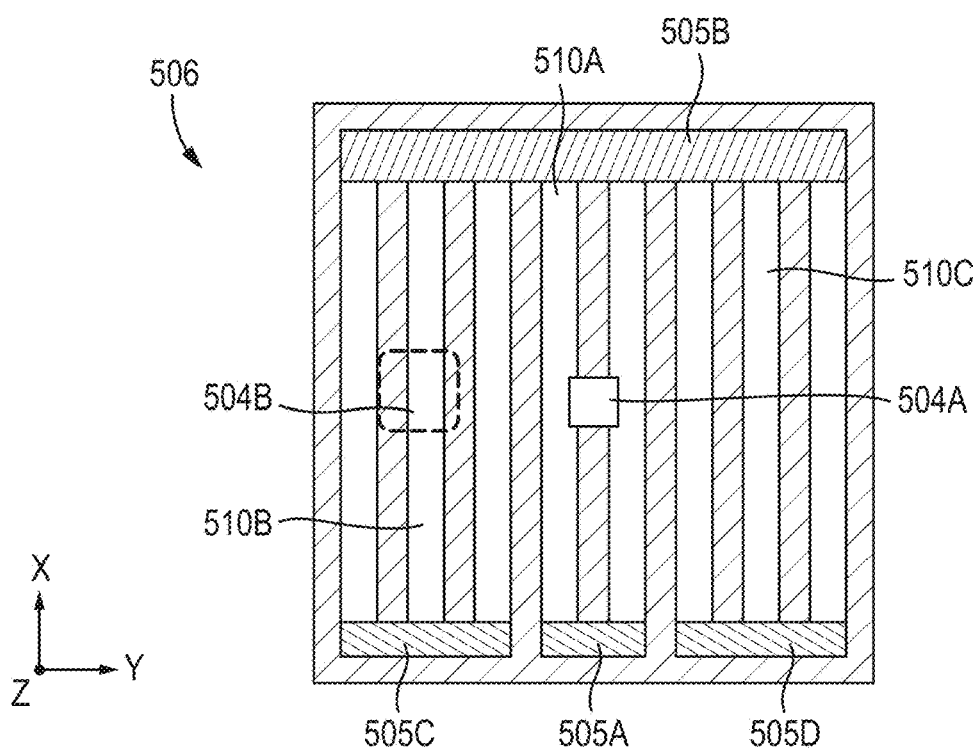
FIG. 5 shows another cold plate of the integrated cooling assembly according to one or more embodiments of the present disclosure.

FIG. 5 is a bottom view of a cold plate 506 in the X-Y plane according to one or more embodiments. The cold plate 506 may be similar to the cold plate 206 described above, and therefore the description of similar features is omitted for brevity. The cold plate 506 comprise a first inlet opening 505A, a second inlet opening 505C, a third inlet opening 505D and an outlet opening 505B. The first inlet opening 505A may comprise a length along the Y-axis direction smaller than a length of the second inlet opening 505C and the third inlet opening 505D along the same direction. In some embodiments, the first inlet opening 505A, the second inlet opening 505C and the third inlet opening 505D may be a single inlet partitioned to form each respective inlet. The cold plate 506 comprises a first coolant channel 510A, a second coolant channel 510B and a third coolant channel 510C extending laterally between the inlet openings 505A, 505C, 505D and the outlet opening 505B. The cold plate 506 differs from the cold plate 206 in that the cold plate 506 comprises more than one inlet opening. It should be noted that although the first coolant channel 510A, the second coolant channel 510B and the third coolant channel 510C are shown as having a similar width, this is exemplary and in other embodiments coolant channels may comprise different channel widths (e.g., similar to the cold plate 206 of the embodiment of FIG. 3D).

The first inlet opening 505A and the outlet opening 505B may be in fluid communication with the first coolant channel 510A. The second inlet opening 505C and the outlet opening 505B may in fluid communication with the second coolant channel 510B and the third inlet opening 505D and the outlet opening 505B may be in fluid communication with the third coolant channel 510B. Each coolant channel (such as the coolant channels 510A, 510B and 510C) may be exclusively in fluid communication with a respective inlet opening (such as the inlet openings 505A, 505C and 505D). The first coolant channel 510A may be connected to the first inlet opening 505A, and not connected to the second and third inlet openings 505C, 505D. The second coolant channel 510B may be connected to the second inlet opening 505C, and not connected to the first and third inlet openings 505A, 505D. The third coolant channel 510C may be connected to the third inlet opening 505D, and not connected to the first and second inlet openings 505A, 505C.

A portion of the first coolant channel may disposed above a hotspot region 504A of a semiconductor device (not shown) to which the cold plate 506 may be attached. A lateral distance in the Y-axis direction between the hotspot region 504A and a midpoint of the first coolant channel 510A may be less than a lateral distance between a midpoint of the second coolant channel 510B and the hotspot region 504A in the same direction. A midpoint of a coolant channel may be taken to mean a region of the coolant channel substantially half way between the inlet and outlet openings to which the coolant channel is fluidly connected.

The semiconductor device may comprise an adjacent region shown by an adjacent region 504B. The adjacent region 504B may be any region of the backside of the semiconductor device which is not determined to be a hotspot region. The second coolant channel 510B may be disposed above (i.e., at least partially overlap or be laterally offset from) the adjacent region 504B of the semiconductor device. The semiconductor device may operate at a first temperature in the hotspot region 504A and operates at a second temperature in the adjacent region 504B. The first temperature may be greater than the second temperature. The semiconductor device may comprise at least one of a computational core, a neural core or a graphical processing unit (not shown) and the hotspot region 504A may be formed by the at least one of the computational core, neural core or graphical processing unit forms the hotspot region 504A. The semiconductor device may comprise at least one of a memory unit, I/O unit, PHY unit or analog unit (not shown) disposed in the adjacent region 504B. A portion of the first coolant channel 510A is disposed above the at least one of the computational core, the neural core or the graphical processing unit of the semiconductor device.

Although the hotspot region 504A is shown to be at a central portion of the semiconductor device, it should be appreciated that this is exemplary and in other embodiments the hotspot region 504A may be at any region of the semiconductor device and may comprise any size or shape.

In the embodiment of FIG. 5, the inlet opening 505A exclusively provides the coolant fluid to the first coolant channel which overlaps and/or is near the hotspot region 504A. This may be advantages because the positioning facilitates precise and selective control of a flow of a coolant through each of the inlet openings 505C, 505A and 505D. In some embodiments, a higher flow rate may be selected for the inlet opening 505A to provide increased cooling performance to the hotspot region 504A (having a relatively high power density) and a lower flow rate may be selected for the inlet openings 505C and 505D because the inlet openings 505C and 505D serve coolant channels that overlap and/or are near regions having a lower power density. In some embodiments, the exact flow rates may be determined based on actual semiconductor device layout and system requirements. In some embodiments, the difference in flow rate for each inlet opening is obtained by utilizing passive means of flow control. In some embodiments, the difference in flow rate for each inlet opening is obtained by utilizing active means of flow control.

Figure 6:
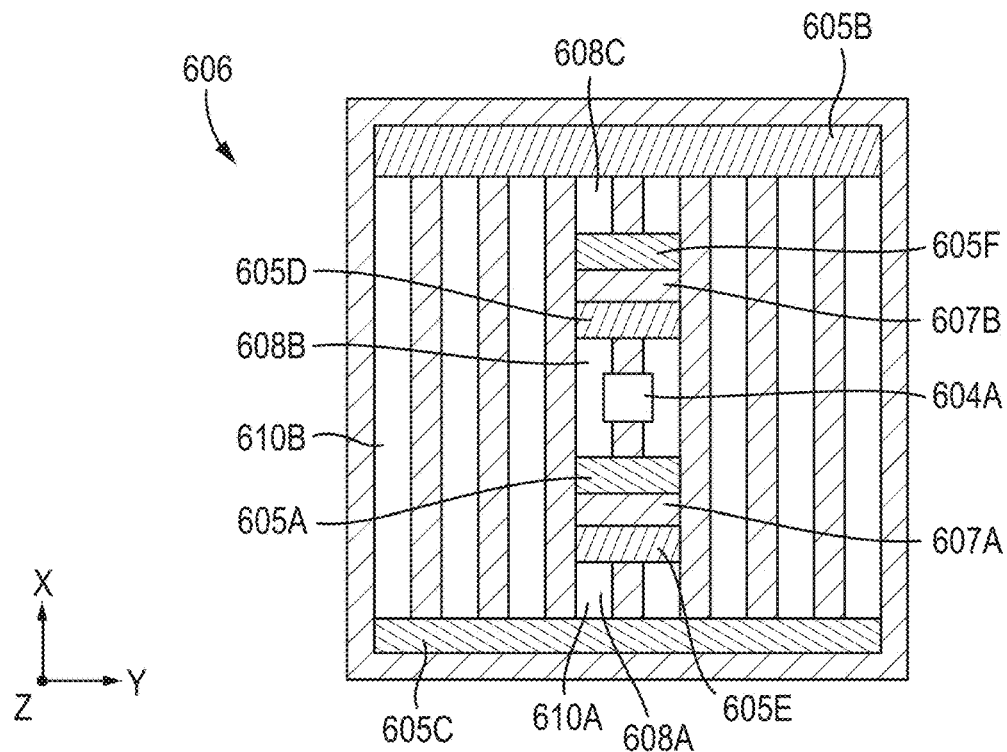
FIG. 6 shows another cold plate of the integrated cooling assembly according to one or more embodiments of the present disclosure.

FIG. 6 is a bottom view of a cold plate 606 in the X-Y plane according to one or more embodiments. The cold plate 606 may be similar to the cold plate 206 described above, and therefore the description of similar features is omitted for brevity. The cold plate 606 comprise a first inlet opening 605A, a second inlet opening 605C and a third inlet opening 605F. The cold plate 606 further comprises a first outlet opening 605D, a second outlet opening 605E and a third outlet opening 605B.

The cold plate 606 further comprises a first coolant channel 610A and a second coolant channel 610B extending laterally between the second inlet opening 605C, and the third outlet opening 605B. The cold plate 606 differs from the cold plate 206 in that the cold plate 606 comprises more than one inlet opening and more than one outlet opening. It should be noted that although the first coolant channel 610A and the second coolant channel 610B are shown as having a similar width, this is exemplary and in other embodiments coolant channels may comprise different channel widths (e.g., similar to the cold plate 206 of the embodiment of FIG. 3D).

The cold plate 606 further comprises a first partition 607A and a second partition 607B disposed in the first coolant channel 610A to divide the first coolant channel 610A into a first portion 608A, a second portion 608B and a third portion 608C. Each portion may be fluidly sealed from any other portion. The first and second partitions 607A, 607B may be formed in a similar manner to the dividers 230 of the embodiment of FIG. 3D.

The second inlet opening 605C and the second outlet opening 605E may be in fluid communication with the first portion 608A. The first inlet opening 605A and the first outlet opening 605D may be in fluid communication with the second portion 608B. The third inlet opening 605F and the third outlet opening 605B may be in fluid communication with the third portion 608C. The second inlet opening 605C and the third outlet opening 605B may be in fluid communication with the second coolant channel 610B. A lateral distance in the Y-axis direction between the hotspot region 604A and a midpoint of the first coolant channel 610A may be less than a lateral distance between a midpoint of the second coolant channel 610B and the hotspot region 604A in the same direction. A midpoint of a coolant channel may be taken to mean a region of the coolant channel substantially half way between the inlet and outlet openings to which the coolant channel is fluidly connected.

The second portion 608B of the first coolant channel 610A may be disposed above (i.e., at least partially overlap or be laterally offset from) a hotspot region 604A of a semiconductor device (not shown). Each coolant channels and the portions thereof (such as the coolant channels 610A and 610B and first to third portions 608A, 608B and 608C) may be exclusively in fluid communication with a respective inlet opening (such as the inlet openings 605A, 605C and 605F). The first portion 608A may be connected to the second inlet opening 605C and the second outlet opening 605E, and not connected to the first and third inlet openings 605A,605F and the first and third outlet openings 605D, 605B. The second portion 608B may be connected to the first inlet opening 605A and the first outlet opening 605D, and not connected to the second and third inlet openings 605C,605F and the second and third outlet openings 605E, 605B. The third portion 608C may be connected to the third inlet opening 605F and the third outlet opening 605B, and not connected to the first and second inlet openings 605A, 605C and the first and second outlet openings 605E, 605D. The second coolant channel 610B may be connected to the second inlet opening 605C and the third outlet opening 605B, and not connected to the first and third inlet openings 605A, 605F and the first and second outlet openings 605E, 605D.

Although the hotspot region 604A is shown to be at a central portion of the semiconductor device, it should be appreciated that this is exemplary and in other embodiments the hotspot region 604A may be at any region of the semiconductor device and may comprise any size or shape.

A first coolant fluid may enter through the second inlet opening 605C and flow through the first portion 608A of the first coolant channel 610A and the second coolant channel 610B and exit through the second outlet opening 605E and the third outlet opening 605B respectively. A second coolant fluid may enter through the first inlet opening 605A and flow through the second portion 608B of the first coolant channel 610A and exit through the first outlet opening 605D. A third coolant fluid may enter through the third opening 605F and flow through the third portion 608C of the first coolant channel 610A and exit through the third outlet opening 605B.

The inlet opening 605A and the outlet opening 605D provide the third coolant fluid to the second portion 608B of the first coolant channel which overlaps and/or is near the hotspot region 604A. This may allow precise and selective control of a flow of a coolant to the hotspot region 604A. In some embodiments, a higher flow rate may be selected for the first inlet opening 605A to provide more cooling power to the hotspot region 604A and a lower flow rate may be selected for the inlet openings 605C and 605F because the inlet openings 605C and 605F serve coolant channels and/or portions of the first coolant channel that overlap and/or are near regions having a lower power density. In some embodiments, the exact flow rates may be to be determined based on actual semiconductor device layout and system requirements. In some embodiments, the difference in flow rate for each inlet opening is obtained by utilizing passive means of flow control. In some embodiments, the difference in flow rate for each inlet opening is obtained by utilizing active means of flow control.

The first inlet opening 605A may be offset (i.e., be laterally offset) from the hotspot region 604A to avoid liquid stagnation at the point of ingress of the third coolant fluid. Localised cooling provided to the hotspot region 604A by the first inlet opening 605A and the first outlet opening 605D may reduce cross heating across a semiconductor device.

Figure 7:
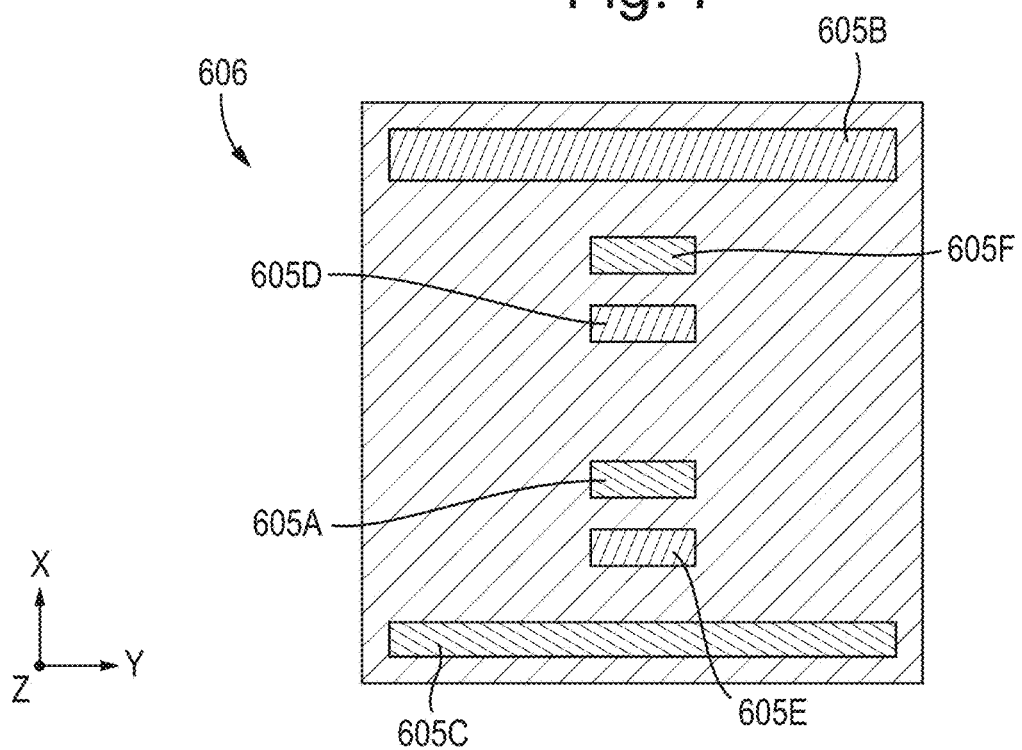
FIG. 7 shows another cold plate of the integrated cooling assembly in accordance with embodiments of the present disclosure.

FIG. 7 illustrates a top view of the cold plate 606 in the X-Y plane. The first, second and third inlet openings 605A, 605C, 605F as well as the first, second and third outlet openings 605B, 605D, 605E are shown. A manifold (not shown) may be attached to the cold plate 606 to deliver the coolant fluid to each of the inlet openings and collect the coolant fluid from each of the outlet openings.

Figure 8:
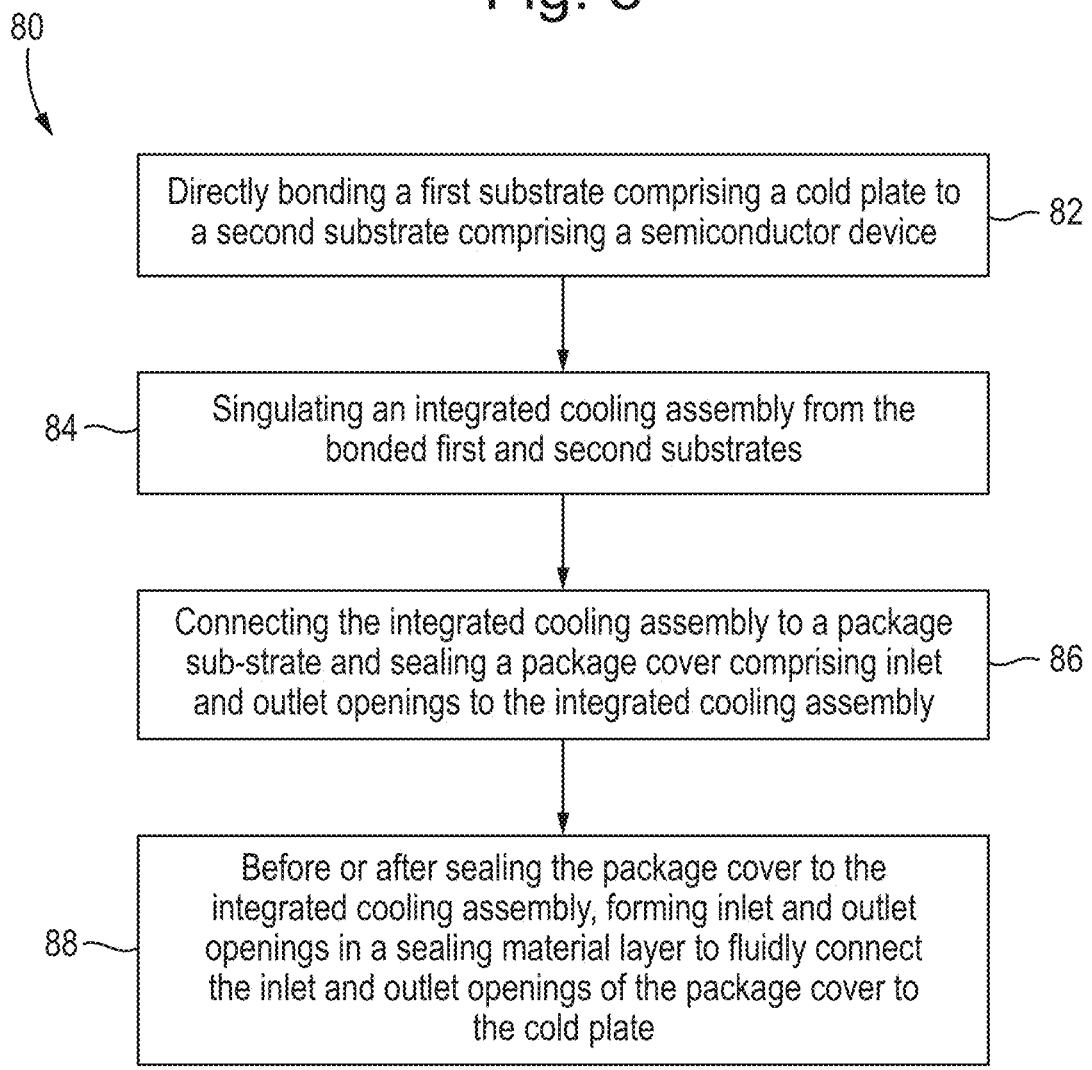
FIG. 8 shows a method that can be used to manufacture the device package in accordance with embodiments of the present disclosure.

FIG. 8 is a flow diagram showing a method 80 of forming an integrated cooling assembly according to embodiments of the present disclosure. Generally, the method 80 includes bonding a first substrate comprising one or more cold plates 206 to a second substrate comprising one or more semiconductor devices 204, and singulating one or more integrated cooling assemblies 203 from the bonded first and second substrates. For example, a wafer (bare or reconstituted wafer) comprising one or more cold plates 206 can be directly bonded to another wafer (bare or reconstituted wafer) comprising one or more semiconductor devices 204.

It will be understood that the first substrate may be a cold plate die or part of a wafer of cold plates. Further, the second substrate may be a semiconductor device die or part of a wafer of semiconductor devices 204. Therefore, the method 80 may include die-to-die direct bonding (e.g., cold plate die to semiconductor device die), water-to-die direct bonding (e.g., cold plate die to semiconductor device wafer, or cold plate wafer to semiconductor device die), and wafer-to-wafer direct bonding (e.g., cold plate wafer to semiconductor device wafer). It will be understood that the singulation step (discussed in relation to block 84 below) may not be required for a die-to-die direct bonding operation.

For simplicity, the following description is focused on forming one integrated cooling assembly 203 comprising one cold plate 206 and one semiconductor device 204. However, as mentioned above, in some embodiments, the first substrate may comprise plural cold plates 206 and the second substrate may comprise plural semiconductor devices 204, such that plural integrated cooling assemblies 203 may be formed from the first and second substrates.

At block 82, the method 80 includes directly bonding the first substrate (e.g., a monocrystalline silicon wafer) comprising a cold plate 206 to the second substrate (e.g., a monocrystalline silicon wafer) comprising a semiconductor device 204 without an intervening adhesive.

In some embodiments, the first substrate may be etched using a patterned mask layer formed on its surface to form features of the cold plate 206. An anisotropic etch process may be used, which uses inherently differing etch rates for the silicon material as between {100} plane surfaces and {111} plane surfaces when exposed to an anisotropic etchant.

In some embodiments, the etching process is controlled to where the etch rates of the substrate surfaces have a ratio between about 1:10 and about 1:200, such as between about 1:10 and about 1:100, for example between about 1:10 and 1:50, or between about 1:25 and 1:75. Examples of suitable anisotropic wet etchants include aqueous solutions of potassium hydroxide (KOH), ethylene diamine and pyrocatechol (EPD), ammonium hydroxide ($HN_4OH$), hydrazine ($N_2H_4$), or tetra methyl ammonium hydroxide (TMAH). The actual etch rates of the silicon substrate depend on the concentration of the etchant in the aqueous solution, the temperature of the aqueous solution, and a concentration of the dopant in the substrate (if any). Typically, the mask layer is formed of a material which is selective to anisotropic etch compared to the underlying monocrystalline silicon substrate. Examples of suitable mask materials include silicon oxide ($Si_xO_x$) or silicon nitride ($Si_xN_y$). In some embodiments, the mask layer has a thickness of about 100 nm or less, such as about 50 nm or less, or about 30 nm or less. The mask layer may be patterned using any suitable combination of lithography and material etching patterning methods.

The second substrate may include a bulk material, and a plurality of material layers disposed on the bulk material. The bulk material may include any semiconductor material suitable for manufacturing semiconductor devices, such as silicon, silicon carbide, silicon germanium, germanium, group III-V semiconductor materials, group II-VI semiconductor materials, or combinations thereof. While some high-performance processors like CPUs, GPUs, NPUs, and TPUs are typically made out of silicon, some other high power density (hence substantial heat generating) devices may comprise silicon carbide or gallium nitride, for example. In some embodiments, the second substrate may include a monocrystalline wafer, such as a silicon wafer, a plurality of device components formed in or on the silicon wafer, and a plurality of interconnect layers formed over the plurality of device components. In other embodiments, the second substrate may comprise a reconstituted substrate, e.g., a substrate formed from a plurality of singulated devices embedded in a support material. In some embodiments, each semiconductor device may have its own individual cold plate fabricated through a reconstitution process.

The bulk material of the second substrate may be thinned after the semiconductor device 204 is formed using one or more backgrinding, etching, and polishing operations that remove material from the backside. Thinning the second substrate may include using a combination of grinding and etching processes to reduce the thickness (in the Z-direction) to about 450 μm or less, such as about 200 μm or less, or about 150 μm or less or about 50 μm or less. After thinning, the backside 220 may be polished to a desired smoothness using a chemical mechanical polishing (CMP) process, and the dielectric material layer may be deposited thereon. In some embodiments, the dielectric material layer may be polished to a desired smoothness to prepare the second substrate for the bonding process. In some embodiments, the method 80 includes forming a plurality of metal features in the dielectric material layer in preparation for a hybrid bonding process, such as by use of a damascene process.

In some embodiments, the active side of the second substrate is temporarily bonded to a carrier substrate (not shown) before or after the thinning process. When used, the carrier substrate provides support for the thinning operation and/or for the thinned material to facilitate substrate handling during one or more of the subsequent manufacturing operations described herein.

Here, the method 80 may include forming dielectric layers on one or both the first and second substrates, and directly bonding includes forming dielectric bonds between a first dielectric material layer of the first substrate and a second dielectric material layer of the second substrate (or forming dielectric bonds between one substrate and a dielectric material layer of the other substrate). Direct bonding processes join dielectric layers by forming strong chemical bonds (e.g., covalent bonds) between the dielectric layers.

Generally, directly bonding the surfaces (of the dielectric material layers formed on the first and second substrates) includes preparing, aligning, and contacting the surfaces. Examples of dielectric material layers include silicon oxide, silicon nitride, silicon oxynitride, and silicon carbonitride. Preparing the surfaces may include smoothing the respective surfaces to a desired surface roughness, such as between 0.1 to 3.0 nm RMS, activating the surfaces to weaken or open chemical bonds in the dielectric material, and terminating the surfaces with a desired species. Smoothing the surfaces may include polishing the first and second substrates using a CMP process. Activating and terminating the surfaces with a desired species may include exposing the surfaces to radical species formed in a plasma. The bond interface between the bonded dielectric layers can include a higher concentration of materials from the activation and/or last chemical treatment processes compared to the bulk of the bonding layers. For example, some embodiments that utilize a nitrogen plasma for activation, a nitrogen concentration peak can be formed at the bond interface. In some embodiments, the nitrogen concentration peak may be detectable using secondary ion mass spectroscopy (SIMS) techniques. In various embodiments, a nitrogen termination treatment (e.g., exposing the bonding surface to a nitrogen-containing plasma) can replace OH groups of a hydrolyzed (OH-terminated) surface with $NH_2$ molecules, yielding a nitrogen-terminated surface. In embodiments that utilize an oxygen plasma for activation, an oxygen concentration peak can be formed at the bond interface between non-conductive bonding surfaces.

In some embodiments, the plasma is formed using a nitrogen-containing gas, e.g., $N_2$, and the terminating species includes nitrogen, or nitrogen and hydrogen. In some embodiments, fluorine may also be present within the plasma. In some embodiments, the surfaces may be activated using a wet cleaning process, e.g., by exposing the surfaces to an aqueous ammonia solution. In some embodiments, the dielectric bonds may be formed using a dielectric material layer deposited on only one of the first and second substrates, but not on both. In those embodiments, the direct dielectric bonds may be formed by contacting the deposited dielectric material layer of one of the first and second substrates directly with a bulk material surface (or such a surface with a native oxide) of the other substrate.

Directly forming direct dielectric bonds between the first and second substrates at block 82 may include bringing the prepared and aligned surfaces into direct contact at a temperature less than 150° C. (e.g., less than 100° C., less than 30° C., or about room temperature such as between 20° C. and 30° C.). Without intending to be bound by theory, in the case of directly bonding surfaces terminated with nitrogen and hydrogen (e.g., $NH_2$ groups), it is believed that the hydrogen terminating species diffuse from the interfacial bonding surfaces, and chemical bonds are formed between the remaining nitrogen species during the direct bonding process. In some embodiments, the direct bond is strengthened using an anneal process, where the substrates are heated to and maintained at a temperature of greater than about 30° C. and less than about 450° C., greater than about 50° C. and less than about 250° C., or about 150° C. for a duration of about 5 minutes or more (e.g., 15 minutes). Typically, the bonds will strengthen over time even without the application of heat. Thus, in some embodiments, the method does not include heating the substrates.

In embodiments where the first and second substrates are bonded using hybrid dielectric and metal bonds, the method 80 may further include planarizing or recessing the metal features below the dielectric field surface before contacting and bonding the dielectric material layers. After the dielectric bonds are formed, the first and second substrates may be heated to a temperature of 150° C. or more and maintained at the elevated temperature for a duration of about 1 hour or more, such as between 8 and 24 hours, to form direct metallurgical bonds between the metal features.

Suitable direct dielectric and hybrid bonding technologies that may be used to perform aspects of the methods described herein include ZiBond® and DBIR, each of which are commercially available from Adeia Holding Corp., San Jose, CA, USA.

At block 84, the method 80 includes singulating at least one integrated cooling assembly 203 from the bonded first and second substrates. Singulation after bonding may impart distinctive structural characteristics on the integrated cooling assembly 203 as the bonding surface of the cold plate 206 has the same perimeter as the backside of the semiconductor device 204 bonded thereto. Thus, the sidewalls (e.g., side surfaces) of the cold plate 206 are typically flush with the edges (e.g., side surfaces) of the semiconductor device 204 about their common perimeters. In some embodiments, the cold plate 206 is singulated from the first substrate using a process that cuts or divides the first substrate in a vertical plane, i.e., in the Z-direction. In those embodiments, the side surfaces of the cold plate 206 are substantially perpendicular to the backside 220 of the semiconductor device 204, i.e., a horizontal (X-Y) plane of an attachment interface between the semiconductor device 204 and the cold plate 206. In some embodiments, the cold plate 206 is singulated using a saw or laser dicing process.

At block 86, the method 80 may include connecting the integrated cooling assembly 203 to the package substrate 202 and sealing a package cover 208 comprising inlet and outlet openings 212 to the integrated cooling assembly 203 by use of a molding compound that when cured, forms a sealing material layer 222.

At block 88, the method 80 may include, before or after sealing the package cover 208 to the integrated cooling assembly 203, forming inlet and outlet openings 222A in the sealing material layer 222 to fluidly connect the inlet and outlet openings 212 of the package cover 208 to the cold plate 206.

Figure 9:
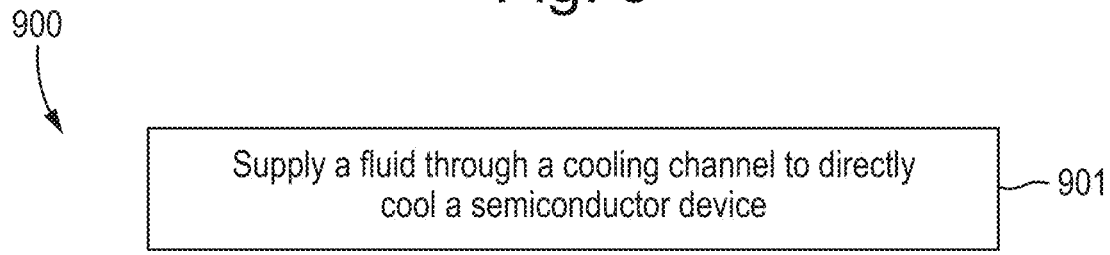
FIG. 9 shows a method of using a device package in accordance with one or more embodiments of the present disclosure.

FIG. 9 is a flow diagram of a method 900 for using a device package in accordance with one or more embodiments of the present disclosure. At block 901, a fluid is supplied through a cooling channel to directly cool a semiconductor device. For example, with reference to FIGS. 1 and 2A, a coolant fluid may be supplied (e.g., delivered) into an inlet opening of the package cover 208 and an inlet opening of the sealing material layer 222 from coolant lines 108. The coolant fluid may subsequently pass through cooling channels 210A, 210B within a semiconductor device 204. The coolant fluid may subsequently exit through an outlet opening of the package cover 208 and outlet opening of the sealing material layer 222 and into coolant lines.

Figure 10:
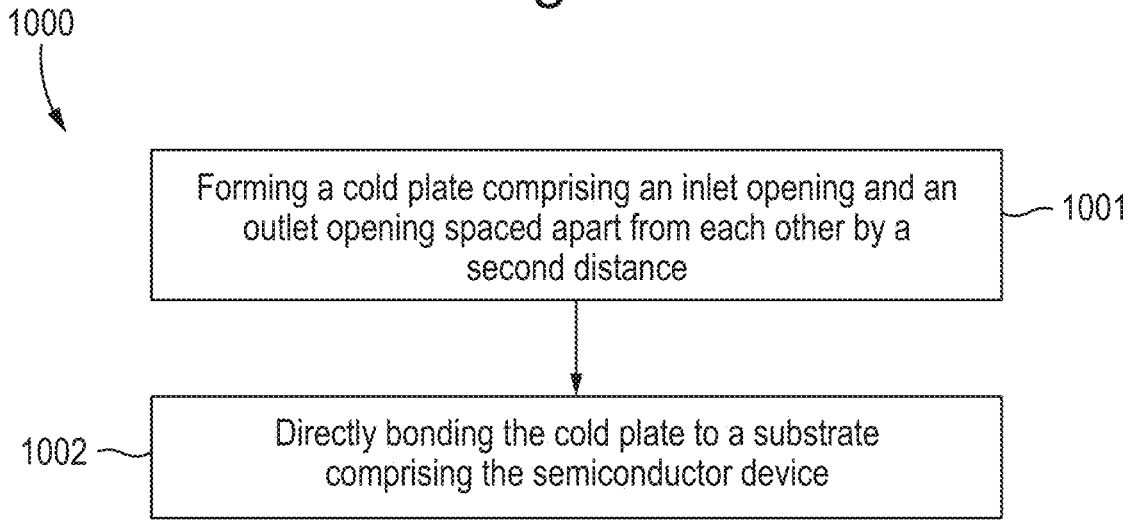
FIG. 10 shows a method that can be used to manufacture an integrated cooling assembly in accordance with one or more embodiments of the present disclosure.

FIG. 10 is a flow diagram of a method 1000 for manufacturing an integrated cooling assembly in accordance with one or more embodiments of the present disclosure. At bock 1001, the method 1000 comprises forming a cold plate comprising an inlet opening and an outlet opening. The cold plate may be formed as discussed above in relation to the method 80 of FIG. 8. For example, the cold plate may be dry etched to form the inlet opening and the outlet opening, using a patterned mask layer formed on surfaces of the cold plate. An anisotropic dry etch process may be used, in which inherently differing etch rates are used for the silicon material which is exposed to an anisotropic etchant when the patterned mask layer is formed. At block 1002, the cold plate is directly bonded to a semiconductor device. The direct bonding may be a hybrid bonding as discussed above in relation to the method 80 of FIG. 8.

Figure 11:
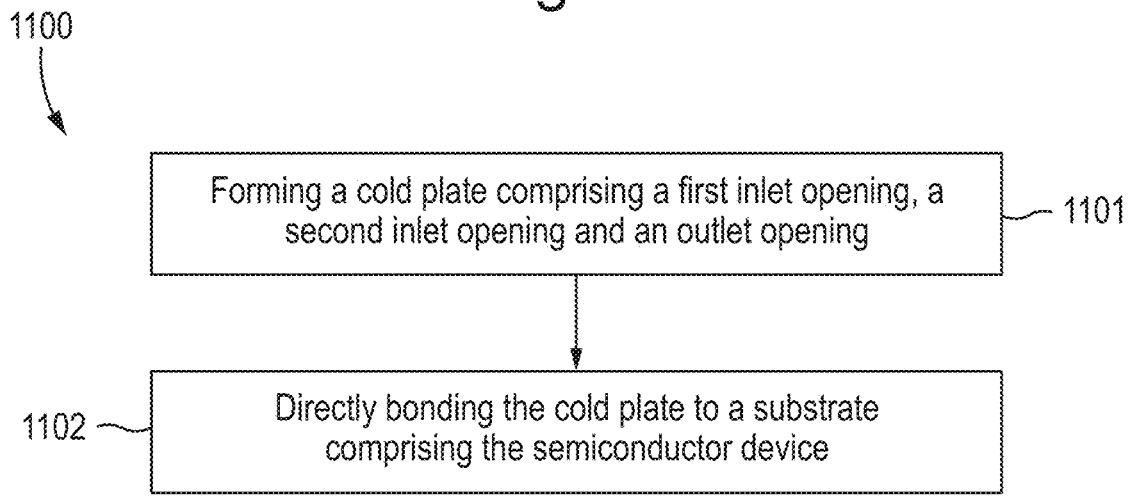
FIG. 11 shows a method that can be used to manufacture an integrated cooling assembly in accordance with one or more embodiments of the present disclosure.

FIG. 11 is a flow diagram of a method 1100 for manufacturing an integrated cooling assembly in accordance with one or more embodiments of the present disclosure. At bock 1101, the method 1100 comprises forming a cold plate comprising a first inlet opening, a second inlet opening and an outlet opening. The cold plate may be formed as discussed above in relation to method 80 of FIG. 8. For example, the cold plate may be dry etched to form the first inlet opening, the second inlet opening and the outlet opening, using a patterned mask layer formed on surfaces of the cold plate. An anisotropic dry etch process may be used, in which inherently differing etch rates are used for the silicon material which is exposed to an anisotropic etchant when the patterned mask layer is formed. At block 1102, the cold plate is directly bonded to a semiconductor device. The direct bonding may be a hybrid bonding as discussed above in relation to method 80 of FIG. 8.

The embodiments discussed above are intended to be illustrative and not limiting. One skilled in the art would appreciate that individual aspects of the cooling assemblies, device packages, and methods discussed herein may be omitted, modified, combined, and/or rearranged without departing from the scope of the disclosure.

What is claimed is:

1. An integrated cooling assembly comprising:
   a semiconductor device; and
   a cold plate directly bonded to the semiconductor device, the cold plate comprising:
      a top portion, sidewalls and a divider extending downwardly from the top portion to a backside of the semiconductor device;
      a first inlet opening, a second inlet opening and an outlet opening disposed in the top portion, wherein:
         the top portion, the sidewalls, the divider and the backside of the semiconductor device collectively define a first coolant channel and a second coolant channel extending laterally between the inlet openings and the outlet opening;
         the first inlet opening and the outlet opening are in fluid communication with the first coolant channel;
         the second inlet opening and the outlet opening are in fluid communication with the second coolant channel; and
         a portion of the first coolant channel is disposed above a hotspot region of the semiconductor device.

2. The integrated cooling assembly according to claim 1, wherein the first coolant channel is fluidly sealed from the second coolant channel.

3. The integrated cooling assembly according to claim 1, wherein a channel width of the first coolant channel in a direction parallel to the backside of the semiconductor device is greater than a channel width of the second coolant channel in the same direction.

4. The integrated cooling assembly according to claim 1, wherein:
   the semiconductor device comprises an adjacent region;
      the semiconductor device operates at a first temperature in the hotspot region and operates at a second temperature in the adjacent region; and
      the first temperature is greater than the second temperature.

5. The integrated cooling assembly according to claim 4, wherein:
- the semiconductor device comprises at least one of a computational core, a neural core or a graphical processing unit;
- the hotspot region is formed by the at least one of the computational core, the neural core or the graphical processing unit; and
- the semiconductor device comprises at least one of a memory unit, an 1/0 unit, a PHY unit or an analog unit disposed in the adjacent region.

6. The integrated cooling assembly according to claim 1, wherein the hotspot region has at least one of a power density greater than an average power density of the semiconductor device, a surface through which heat energy passes at an amount exceeding a threshold value, or a temperature that exceeds a threshold temperature.

7. An integrated cooling assembly comprising:
- a semiconductor device; and
- a cold plate directly bonded to the semiconductor device, the cold plate comprising:
  - a top portion, sidewalls and a divider extending downwardly from the top portion to a backside of the semiconductor device;
  - a first inlet opening, a second inlet opening, a first outlet opening, and a second outlet opening disposed in the top portion, wherein:
    - the top portion, the sidewalls, the divider and the backside of the semiconductor device collectively define a first coolant channel and a second coolant channel extending laterally between the inlet openings and the outlet openings;
    - the first inlet opening and the first outlet opening are in fluid communication with the first coolant channel;
    - the second inlet opening and the first outlet opening are in fluid communication with the second coolant channel; and
    - a portion of the first coolant channel is disposed above a hotspot region of the semiconductor device; and
  - a first partition disposed in the first coolant channel to divide the first coolant channel into a first portion and a second portion fluidly sealed from the first portion, wherein:
    - the second inlet opening and the second outlet opening are in fluid communication with the first portion; and
    - the first inlet opening and the first outlet opening are in fluid communication with the second portion.

8. The integrated cooling assembly according to claim 7, wherein the second portion of the first coolant channel is the portion of the first coolant channel disposed above the hotspot region of the semiconductor device.

9. The integrated cooling assembly according to claim 7, wherein the first portion of the first coolant channel is the portion of the first coolant channel disposed above the hotspot region of the semiconductor device.

10. The integrated cooling assembly according to claim 7, wherein the cold plate further comprises:
- a second partition disposed in the first coolant channel to divide the first coolant channel into a third portion fluidly sealed from the first portion and the second portion; and
- a third inlet opening and a third outlet opening in the top portion, wherein:
  - the third inlet opening and the third outlet opening are in fluid communication with the third portion, and
  - the third portion of the first coolant channel is the portion of the first coolant channel disposed above the hotspot region of the semiconductor device.

* * * * *